United States Patent
Olnowich et al.

[11] Patent Number: 5,835,024
[45] Date of Patent: Nov. 10, 1998

[54] MULTI-STAGE INTERCONNECTION NETWORK WITH SELECTABLE FUNCTION SWITCHING APPARATUS

[75] Inventors: Howard Thomas Olnowich, Endwell, N.Y.; Jehoshua Bruck, La Canada, Calif.; James William Feeney, Endicott, N.Y.; Michael Hans Fisher, Rochester, Minn.; Eliezer Upfal, Palo Alto, Calif.; Arthur Robert Williams, Croton-On-Hudson, N.Y.

[73] Assignee: International Business Machines Corporation, Armonk, N.Y.

[21] Appl. No.: 481,855

[22] Filed: Jun. 7, 1995

[51] Int. Cl.$^6$ .................................................. H03K 17/04
[52] U.S. Cl. ................................. 340/825.79; 340/825.8; 340/826; 370/388; 370/381; 395/311; 379/221; 379/273
[58] Field of Search .................. 340/825.79, 825.03, 340/825.8, 826, 825.89; 370/388, 398, 397, 399, 381, 379, 359; 326/41, 38; 395/312, 800, 311; 364/514 C; 379/219, 220, 221, 224, 268, 271, 272, 273, 291, 292, 306

[56] References Cited

U.S. PATENT DOCUMENTS

| | | | |
|---|---|---|---|
| 4,616,359 | 10/1986 | Fontenot | 370/397 X |
| 4,965,788 | 10/1990 | Newman | 370/60 |
| 4,991,168 | 2/1991 | Richards | 370/54 |
| 4,993,016 | 2/1991 | Richards | 370/54 |
| 5,072,217 | 12/1991 | Georgiou et al. | 340/825.79 |
| 5,091,905 | 2/1992 | Amada | 370/60 |
| 5,124,978 | 6/1992 | Chao | 370/60 |
| 5,144,297 | 9/1992 | Ohara | 340/825.79 |
| 5,173,897 | 12/1992 | Schrodi et al. | 370/60 |
| 5,179,558 | 1/1993 | Thacker et al. | 370/94.3 |
| 5,181,017 | 1/1993 | Frey, Jr. et al. | 340/825.02 |
| 5,303,232 | 4/1994 | Proctor et al. | 370/398 |
| 5,345,229 | 9/1994 | Olnowich et al. | 340/825.8 |
| 5,444,705 | 8/1995 | Olnowich et al. | 370/388 |

OTHER PUBLICATIONS

IBM® Technical Disclosure Bulletin: *Asynchronous Digital Video Switching System*, Oct. 1990, vol. 33 No. 5, pp. 227–233.

IBM® Technical Disclosure Bulletin: *XNL Switch And Its Control*, Jan. 1992, vol. 34 No. 8, pp. 16–21.

*Primary Examiner*—Brian Zimmerman
*Assistant Examiner*—William H. Wilson, Jr.
*Attorney, Agent, or Firm*—Michele A. Mobley; Jenkens & Gilchrist; Eugene I Shkurko

[57] ABSTRACT

The present invention addresses the limitations of prior art ALLNODE switches by including dual priority, adaptive, path seeking, and flash-flood functionalities in a single ALLNODE switch. The switch of the present invention further includes a selection device responsive to a selection signal for enabling the selection of the mode of switch operation from any one of the foregoing functionalities. The selection signal is applied to the switch in a number of different ways including: the transmission of a command over the data path interface to the switch; the transmission of a command over special purpose serial or parallel control lines; or via hardwiring. Thus, the selection of functionality for the switch is capable of being made in either a dynamic or static fashion. The present invention further comprises two new high performance networks utilizing the selectable function ALLNODE switch. The networks have a different functionality being performed at each stage, and comprise a "Multi-Dilated Path Seeking Network" and a "Nested Path Seeking and Flash-Flood Network."

20 Claims, 22 Drawing Sheets

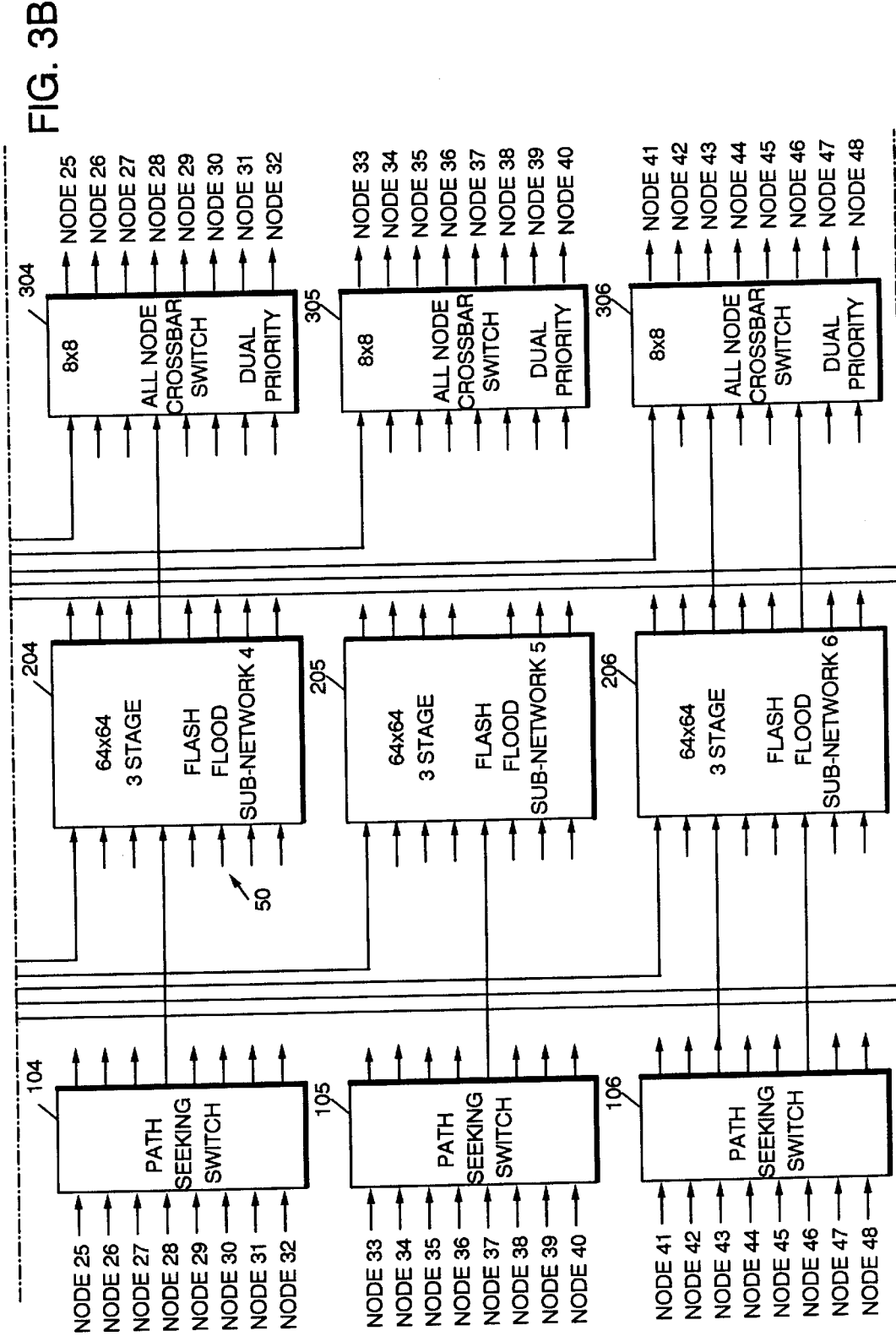

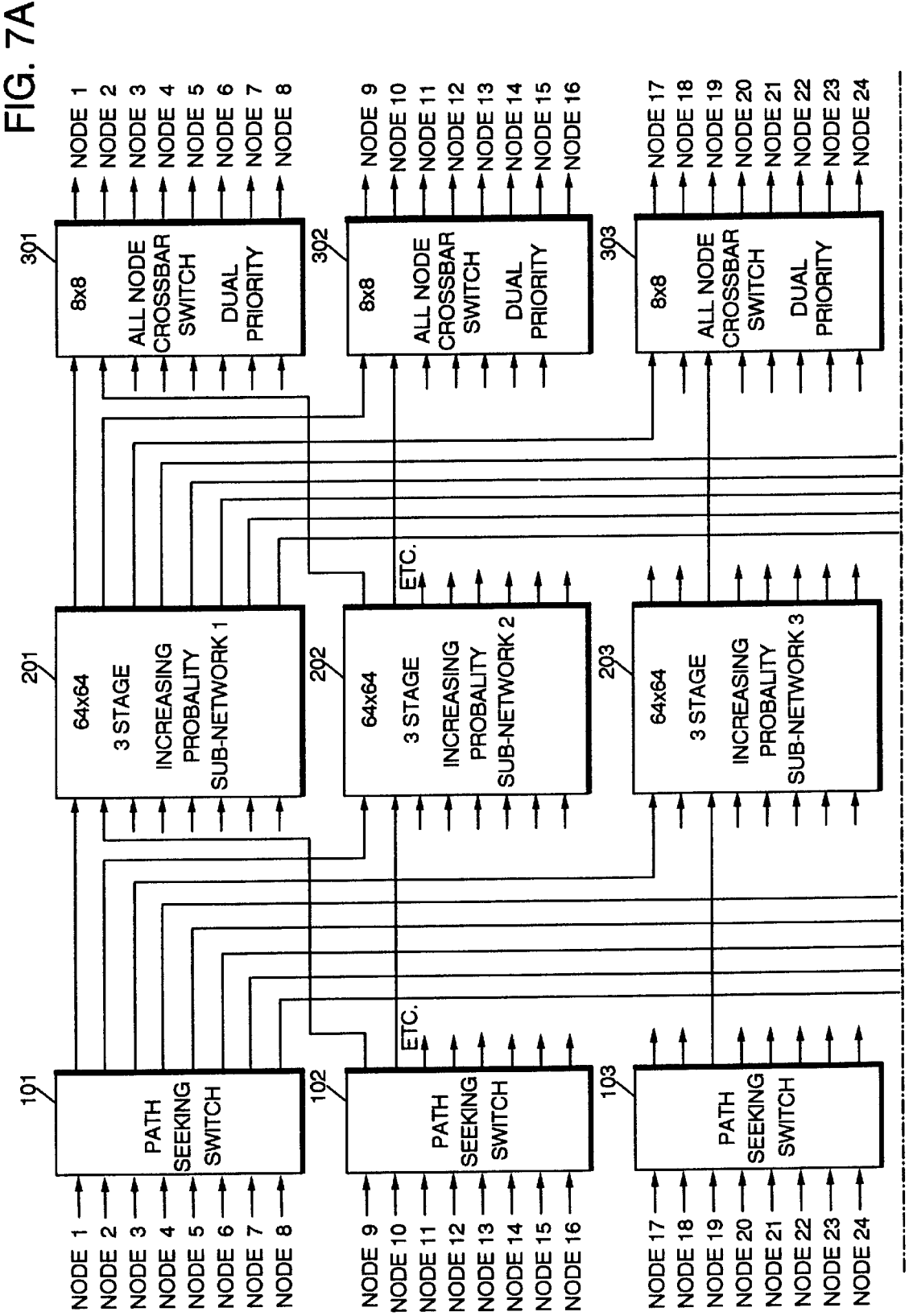

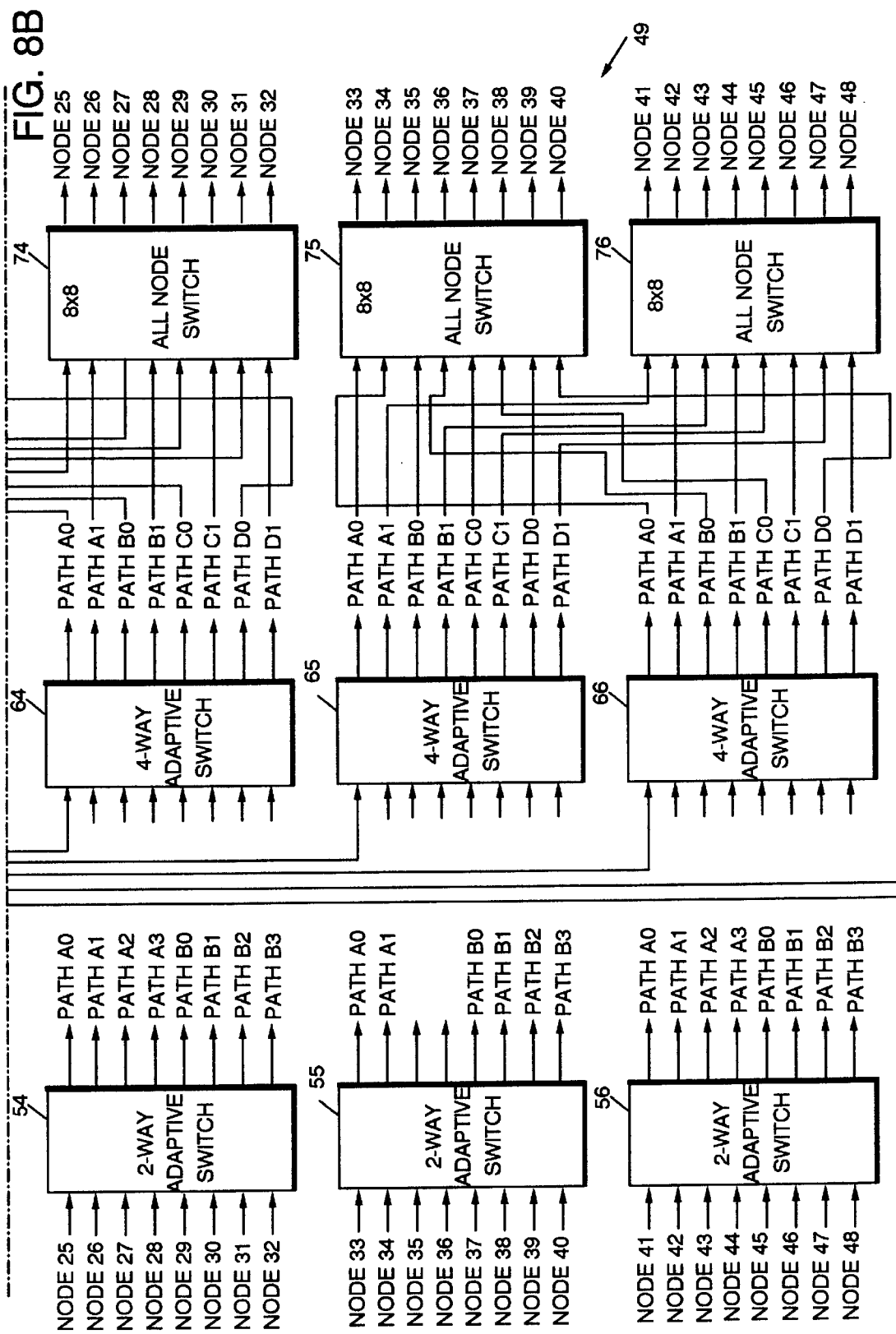

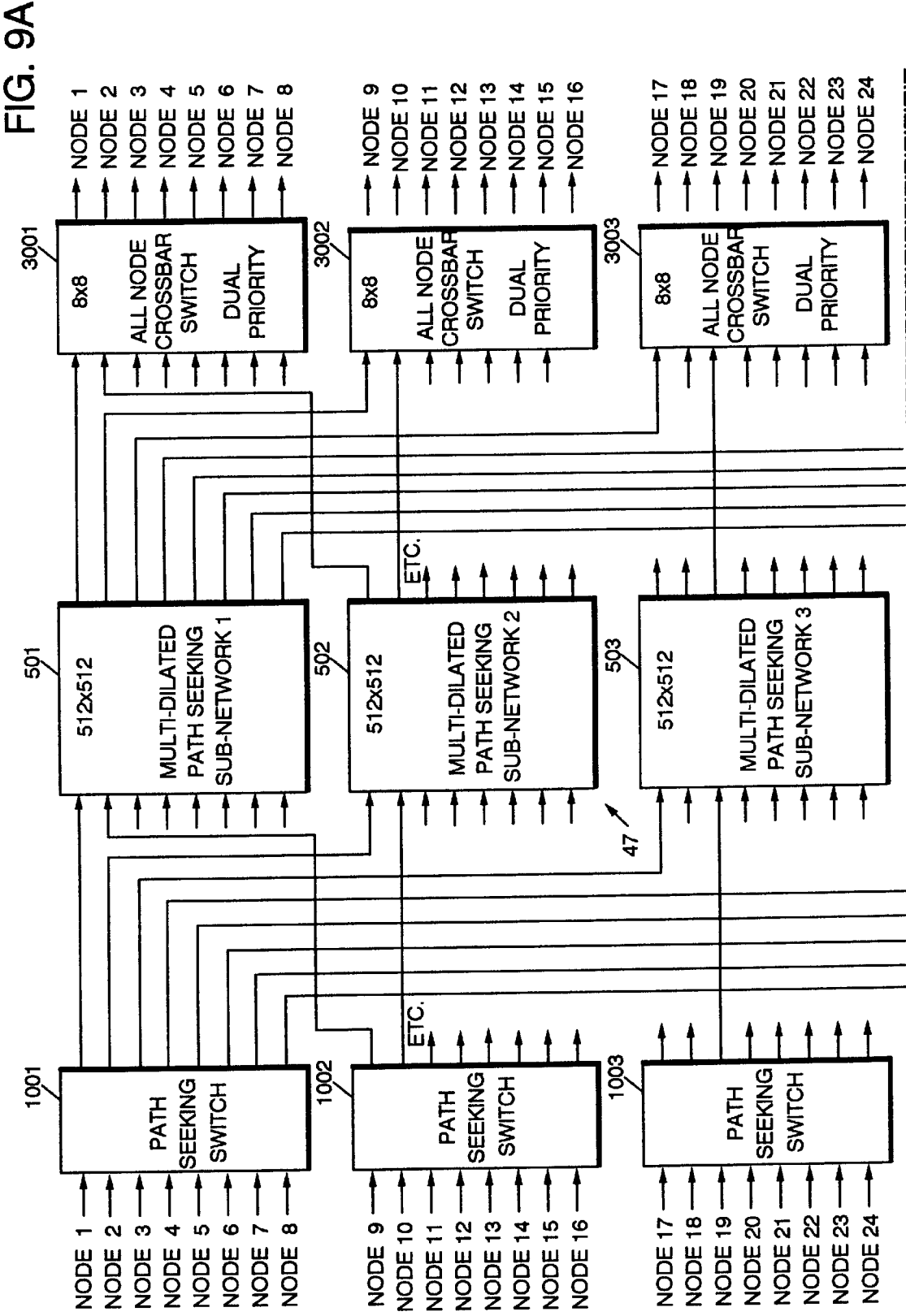

MULTI-STAGE INTERCONNECTION NETWORK WITH SELECTABLE FUNCTION SWITCHING APPARATUS

CROSS-REFERENCE TO RELATED APPLICATIONS

This application for patent is related to the following prior applications for patent:

U.S. Ser. No. 07/677,543, filed Mar. 29, 1991, entitled "All-Node Switch, An Unclocked, Unbuffered Asynchronous Switching Apparatus" by P.A. Franaszek, et al. now abandoned, but continued as U.S. Ser. No. 08/143,977 now abandoned, but continued as U.S. Ser. No. 08/457,789 and now on appeal;

Application Ser. No. 08/216,789, "Multi-Function Network," filed Mar. 23, 1994, now abandoned, which is a continuation of U.S. Ser. No. 07/799,497, entitled "Multi-Function Network" by Howard T. Olnowich, et al. (IBM Docket #EN9-91-017) now abandoned, but continued as U.S. Ser. No. 08/216,789 now abandoned, but continued as U.S. Ser. No. 08/606,232 and allowed and due to issue Aug. 5, 1997 as U.S. Pat. No. 5,654,695;

Application Ser. No. 07/946,514 "Increasing Probability Multi-Stage Network" by J. Feeney et al. filed Sep. 17, 1992 (IBM Docket #EN9-92-127) now issued as U.S. Pat. No. 5,542,048;

Application Ser. No. 07/800,652 "Dual Priority Switching Apparatus for Simplex Networks" by Howard T. Olnowich, et al. filed Nov. 27, 1991 (IBM Docket #EN9-91-016A) now issued as U.S. Pat. No. 5,444,705.

This application for patent is also related to the following application for patent filed concurrently herewith: U.S. Ser. No. 08/481,854, filed Jun. 7, 1995, entitled "Flash-Flooding Multi-Stage Interconnection Network with Parallel Path Seeking Switching Elements" by Howard T. Olnowich, et al. (IBM Docket EN9-94-022), pending.

The disclosures of each of the foregoing applications for patent are hereby incorporated by reference herein for all permissible purposes.

BACKGROUND OF THE INVENTION

1. Technical Field of the Invention

The present invention relates to multi-stage interconnection networks and, in particular, to a selectable function switch for use at any stage of a multi-stage network.

2. Description of the Prior Art

In the field of parallel processing the need for better performing interconnection networks comprising multiple stages is becoming of prime importance. Such multi-stage networks include a plurality of switches (such as, for example, cross-bar switches) at each stage of the network. The switches at the various stages of the network are interconnected to enable transmission of data from any node connected to the input of the first stage to any node connected to the output of the last stage.

One commonly used switch in a multi-stage interconnection network comprises the asynchronous, low latency, inter-node switch (or "ALLNODE Switch") which is the subject of several prior pending applications for patent including U.S. application Ser. No. 07/677,543. A problem experienced with multi-stage networks using conventional ALLNODE switches is that it becomes difficult during instances of heavy loading to win resources across the entire network. Simulations of traditional networks have shown that such networks tend to clog at about a twenty percent loading factor. This percentage is unacceptable in modern networks. The solution to this problem comprises the use of switches with different functionalities at each network stage.

Accordingly, the ALLNODE switch has been further developed in a number of different configurations to separately provide a "dual priority" functionality, a "path seeking" functionality, an "adaptive" functionality, and a "flash-flooding" functionality.

The dual priority functionality implements two different switching operations based on the presence of different types of traffic patterns in the network. The first operation causes connections in the network to be broken if "cold" or random traffic encounters blockage in the network. Following the break, path establishment is retried over a different (alternate) path in the network. The second operation causes traffic into the network which has been classified as "hot" traffic to experience a different network capability of camp-on (wherein previously won connections in the network are not broken) when congestion is experienced in the network. After camp-on, the request for a connection is placed into a priority queue at the switch experiencing blockage and serviced as soon as the blockage dissipates.

In both the adaptive and path seeking functionalities, the switching element determines for itself which of several optional alternate paths to select at each stage of the network based on availability. The difference between the two approaches is that they apply to different network topologies implementing different connection mechanisms. The adaptive functionality applies to dilated network configurations, where the alternate path concept is spread or dilated throughout the entire network. This results in fewer alternate path selections at each stage, but the alternate paths are cascaded to maintain an adequate number of alternate selections throughout the entire network. In contrast, the path seeking functionality applies to omega-type multi-stage networks which confine all of the alternate path selection functions to only one or two of the early stages of the network. Therefore, the path seeking switch selects from a larger number of alternate paths that are concentrated in a single place in the network.

The flash-flooding functionality is an extension of the path seeking functionality wherein parallel path seeking is performed over multiple alternate available paths simultaneously, as opposed to trying available paths one at a time in a serial manner. This is necessary because an alternate path might appear available at the point of decision, but be blocked further on in the network. This permits the multiple paths in the network to be tried simultaneously for the purpose of establishing a single connection. The first path to reach the destination is the winner, and the other losing paths are rejected and broken down.

One problem posed by diverse networks utilizing switches at each of the network stages having different functionalities (like those discussed above) is that the networks are very expensive to maintain. Another problem is that it is very expensive to develop the different types of switches implementing the needed functionalities. A further concern comprises the expense and hassle of maintaining spares and replacement parts for each of the plural different types of network components. An additional drawback of such networks wherein certain switch functionality is provided at specific network stages is a limitation on network flexibility. Changes and reconfigurations of the network to account for new network types and advances in the state-of-the-art in the components are accordingly almost impossible.

Accordingly, there is a need for a switch for use in a multi-stage network that incorporates and allows for the selection of one of a number of included functionalities. Preferably such an improved switch would allow for selection for operation from any of the dual priority, adaptive, path seeking, and flash-flood functionalities currently available and used separately in the ALLNODE-type switches.

SUMMARY OF THE INVENTION

The present invention addresses the limitations of prior art ALLNODE switches by including dual priority, adaptive, path seeking, and flash-flood functionalities in a single ALLNODE switch. The switch of the present invention further includes a selection device responsive to a selection signal for enabling the selection of the mode of switch operation from any one of the foregoing functionalities. The selection signal is applied to the switch in a number of different ways including: the transmission of a command over the data path interface to the switch; the transmission of a command over special purpose serial or parallel control lines; or via hardwiring. Thus, the selection of functionality for the switch is capable of being made in either a dynamic or static fashion.

The present invention further comprises two new high performance networks utilizing the selectable function ALLNODE switch. The networks have a different functionality being performed at each stage, and comprise a "Multi-Dilated Path Seeking Network" and a "Nested Path Seeking and Flash-Flood Network".

BRIEF DESCRIPTION OF THE DRAWINGS

A more complete understanding of the present invention may be obtained by referring to the following Detailed Description in conjunction with the accompanying Drawings wherein.

DESCRIPTION OF THE PREFERRED EMBODIMENT

Figure 1:
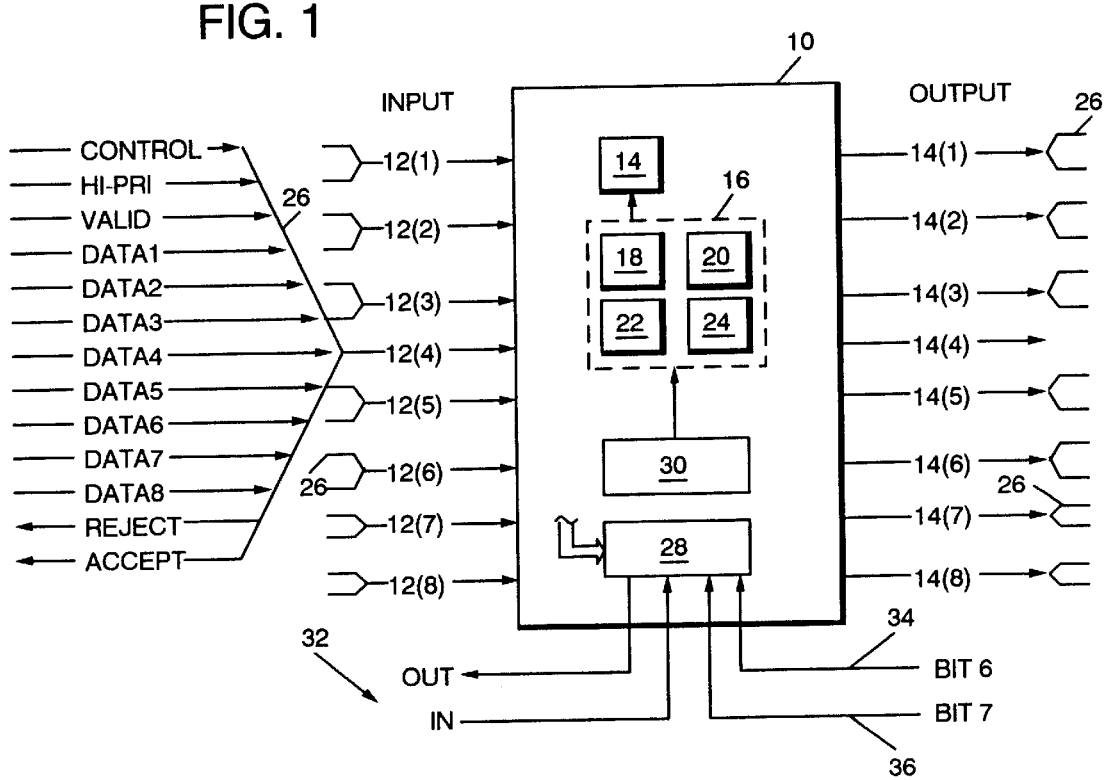
FIG. 1 illustrates an eight-by-eight selectable function switch of the present invention.

Reference is now made to FIG. 1 wherein there is illustrated an eight-by-eight selectable function switch 10 of the present invention including eight input ports 12(1)–12(8) and eight output ports 14(1)–14(8). The switch 10 comprises the known eight-by-eight ALLNODE Switch as described in several pending applications for patent modified to include a connection means 14 under the control of a selected one of a number of included functionalities 16 to connect in specific ways input ports 12 to output ports 14. The functionalities 16 included in the switch 10 comprise the dual priority functionality 18, the adaptive functionality 20, the path seeking functionality 22, and the flash-flooding functionality 24. The switch 10 operates to select for operation one of the functionalities 16 in response to receipt of a switch functionality selection command.

The dual priority functionality 18 is described in U.S. Pat. No. 5,444,705, entitled "Dual Priority Switching Apparatus for Simplex Networks" by Howard T. Olnowich, et al. (IBM Docket #EN9-91-016A).

The adaptive functionality 20 is described in "Adaptive Switching Apparatus for Multi-Stage Networks" by Howard T. Olnowich, et al. (IBM Docket #EN9-92-124) now issued as U.S. Pat. No. 5,345,229; and.

The path seeking functionality 22 and flash-flooding functionality 24 are described in U.S. application Ser. No. 08/481,854, entitled "Flash-Flooding Multi-Stage Interconnection Network with Parallel Path Seeking Switching Elements" by Howard T. Olnowich, et al. (IBM Docket #EN9-94-022), pending.

The interface 26 at each of the input and output ports 12 and 14 contains twelve lines comprising: eight data lines (DATA1–DATA8) plus four interface control lines (VALID, ACCEPT, REJECT, and HI-PRI). The VALID interface control line when active (logic high), indicates that a message is in the process of being transmitted. When inactive (logic low), however, the VALID interface control line causes the switch 10 to reset, breaks all connections, and returns the switch to its idle state. The HI-PRI interface control line when active (logic high) invokes the camp-on switching operation. When inactive (logic low), however, the HI-PRI interface control line invokes the break switching operation. The REJECT interface control line has a signal flow in a direction opposite that of the data signals carried on the data lines (DATA1–DATA8). This control line indicates that a REJECT condition has been detected and that a connection along a selected path was not established or the message was not successfully transmitted. The ACCEPT interface control line also has a signal flow direction opposite that of the data signals carried on the data lines (DATA1–DATA8). This control line is used to acknowledge the successful transmission of a message from the switch 10.

The interface 26 further optionally includes a thirteenth line comprising another interface control line (CONTROL). The CONTROL interface control line has a signal flow direction the same as the data lines (DATA1–DATA8). This control line is used to signal the loading of the switch functionality selection command into the switch 10. The switch functionality selection command is loaded into a function selection control register 28 when the CONTROL line is active (logic high) at the switch 10 that is issuing the ACCEPT signal to confirm that a HI-PRI connection has been made.

There are a number of different ways of loading the switch functionality selection command into the function selection register control 28. The first way utilizes the data lines (DATA1–DATA8) to carry the command and the CONTROL, VALID and HI-PRI interface control lines to inform the switch 10 that the command is being sent. With the rise of the CONTROL, VALID and HI-PRI interface control lines, the data present on the data lines DATA1–DATA8 is stored in the control register 28. The data loaded from data lines DATA7 and DATA8 into bits six and seven of the eight bit control register 28 are decoded 30 to select the functionality 16 of the switch 10 in accordance with Table 1.

TABLE 1

| Bit 6 | Bit 7 | Functionality |
|-------|-------|---------------|
| 0 | 0 | DUAL PRIORITY |
| 0 | 1 | FLASH-FLOOD |
| 1 | 0 | ADAPTIVE |
| 1 | 1 | PATH SEEKING |

The switch functionality selection command on DATA7 and DATA8 is loaded into the switch 10 if DATAL is a logic high when the CONTROL line goes high. To confirm the loading of the proper switch functionality selection command into the switch, the transmission of a logic low on DATAL when the CONTROL line goes high causes the contents of the control register 28 to be read allowing for a verification that the switch 10 is operating with the desired functionality.

Another way of loading the switch functionality selection command into the function selection control register 28 utilizes a serial interface 32 to carry the command. The CONTROL interface control line is not required in this particular way, and that is why it is an optional control line. The function selection control register 28 is written to and read from over the serial interface 32 by means of the shifting of serial data. Bits 6 and 7 of the control register 28 are decoded 30 in accordance with Table 1 to select the functionality 16 of the switch 10. Reading of the control register 28 allows for the verification of switch 10 operation in the desired functionality.

Yet another way of loading the switch functionality selection command into the switch 10 utilizes two I/O pins 34 and 36 connected directly to bits 6 and 7 of the function selection control register 28. The I/O pins 34 and 36 are hardwired with logic high or low values to select the desired functionality 16. Again, bits 6 and 7 of the control register 28 are decoded 30 in accordance with Table 1 to select the functionality 16 of the switch 10. The CONTROL signal control line is not needed to load data into the register 28, but could be used as described above to read the hardwired functionality selection from the register. Reading of the control register 28 allows for the verification of switch 10 operation in the desired functionality.

In connection with the foregoing plural ways of loading the switch functionality selection command into the switch 10, it should be noted that the first two ways are more flexible and permit the switch functionality to be programmed to any switch 10 included in a network. Conversely, the hardwired way requires a physical change to the network to effectuate a change in the switch functionality.

Figure 2:
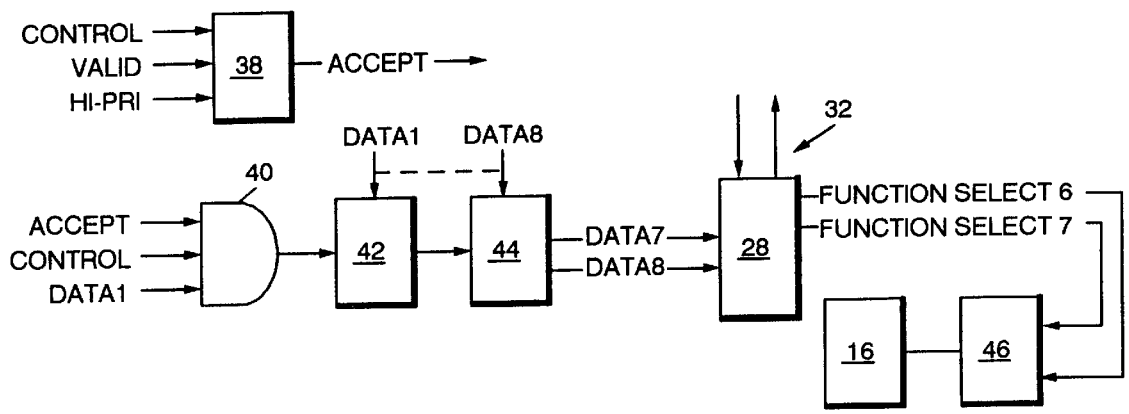
FIG. 2 is a block diagram concerning the logic for implementing the selection of a functionality in the switch shown in FIG. 1.

Reference is now made to FIG. 2 wherein there is shown a more detailed block diagram concerning the selection of a functionality 16 for the switch 10 through the loading of the functionality selection command into the register 28 by a number of different ways. In accordance with the first way of loading, the CONTROL, VALID and HI-PRI interface control lines are activated (logic high) simultaneously to command the loading (DATA1=logic high) of register 28 with the data values simultaneously applied to data lines DATA7 and DATA8. Connection priority logic 38 recognizes the coincidence of three logic high signals on the CONTROL, VALID and HI-PRI interface control lines from one of the input ports 12, determines whether any other input port is attempting to load the register 28, and outputs an ACCEPT signal for only one of the contending input ports indicating that the command from that input port has been accepted.

When ACCEPT, CONTROL, and DATAL are all active (logic high) as detected by AND gate 40, load strobe 42 is activated to load register 28 with the contents of data lines DATA7 and DATA8 as selected through MUX 44. In this connection, MUX 44 selects the data lines from the input port 12 chosen by the connection priority logic 38. The result of this operation is that register 28 permanently latches the functionality command selection. Register 28 then outputs two control signals called Function Select 6 and Function Select 7 to select the appropriate one of the functionalities 16. The selection of a functionality 16 is made by a multiplexer 46 in response to the Function Select 6 and 7 output by the register 28. The Function Select 6 and 7 signals are binary coded to have the multiplexer 46 select one of four functionalities 16 by ouputting an appropriate signal sent to actuate the corresponding functionalities 18, 20, 22 and 24.

For the second and third ways of loading, the functionality selection command is not received from one of the input ports 12, and the optional CONTROL signal is not used to trigger loading. In the second way, register 28 is loaded by shifting serial data comprising the command into the register via the serial interface 32. In the hardwired way, the Function Select 6 and 7 signals are directly and continuously forced to assume the values of the I/O pins 34 and 36.

Figure 3A:
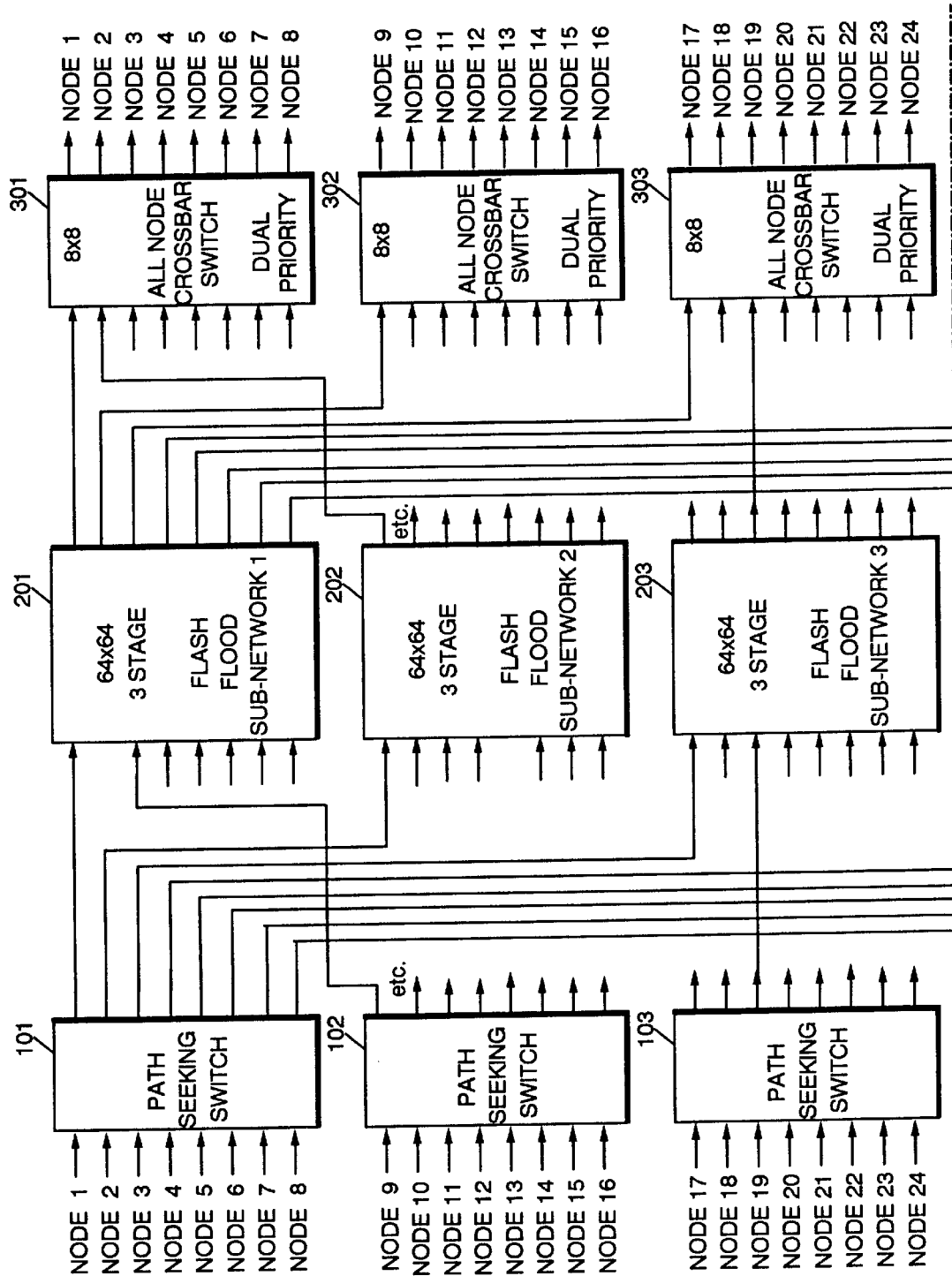
FIG. 3 is a diagram of a five stage 512×512 nested path seeking and flash flood network using the selectable function switch of FIG. 1 at each stage.
Figure 3C:
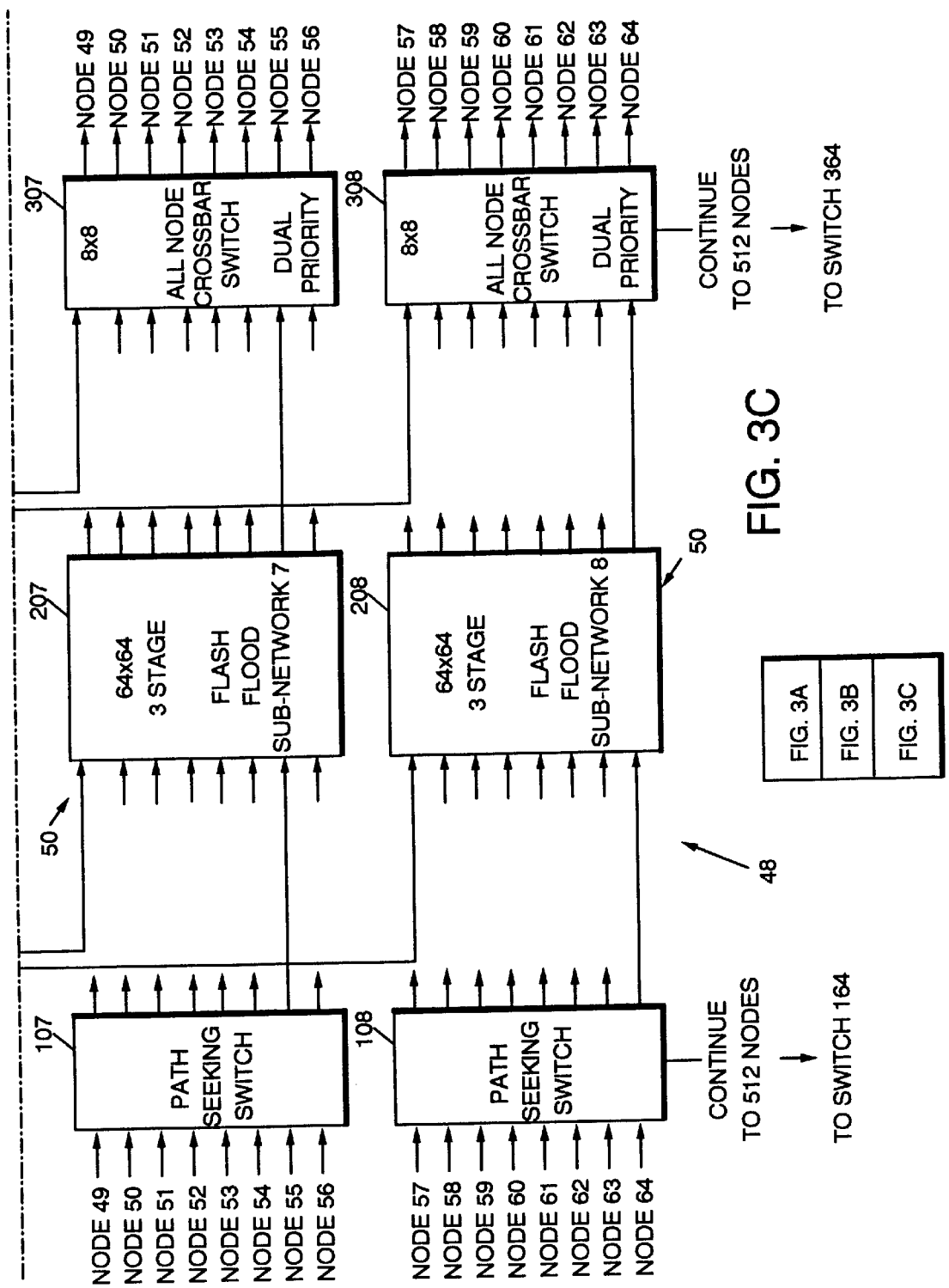

Reference is now made to FIG. 1 and FIG. 3 wherein there is shown an example of a network 48 advantageously utilizing the selectable function switch 10 of the present invention. The network 48 comprises Nested Path Seeking and Flash-Flood Network for servicing five-hundred twelve nodes. The network 48 is formed using three of the four different functionalities 16 provided by the selectable function switch 10. The functionalities used comprise the path seeking functionality 20, the flash-flooding functionality 24, and the dual priority functionality 18.

The network 48 includes five stages utilizing three different functionalities 16 in accordance with the following description: The first network stage comprises sixty-four switches 10 configured for the path seeking functionality 22. The switches 10 in the first stage switches are represented by blocks 101 to 164 (wherein only blocks 101 to 108 are shown to simplify the drawing). Each switch 10 in the first stage interfaces with eight input ports, such that the sixty-four switches 10 in the first stage interface to a total of five-hundred twelve input ports (or NODES).

The path seeking switches in the first stage operate to find a connection to an available alternate path on a non-blocking and prioritized basis. Accordingly, the output port priority amongst the eight output ports per switch are split into two subsets of round robin priorities—a first subset and a second subset. A subset of output ports is uniquely assigned to each subset over the control interface, as disclosed in U.S. Ser. No. 08/481,854, filed Jun. 7, 1995, entitled "Flash-Flooding Multi-Stage Interconnection Network with Parallel Path Seeking Switching Elements" by Howard T. Olnowich, et al. (IBM Docket #EN9-94-022), pending. The two subsets comprise the entire eight output ports per switch. The first subset is assigned higher priority than the second subset, such that a connection commanded to any of the eight output ports will try to establish a connection first to any of the output ports assigned to the first subset. Only if all the first subset ports are unavailable will a connection be made to an output port in the second subset. Conversely, a connection directed to the second and lower priority subset will only try to make a connection within its own subset, and will never try to connect to an output port in the first and higher priority subset. Optionally, if all the second subset ports are unavailable, a connection could be made to an output port in the first subset.

The advantage of the dual round robin priorities is that it makes the switch non-blocking, giving a guarantee of a valid connection from input port to output port. However, in this case the non-blocked connection will be made on a priority basis and will try to establish a connection first to any of the output ports assigned to the first subset. For example, the output ports restricted to "cold" traffic could be assigned to the first subset, and the output ports restricted to "hot" traffic could be assigned to the second subset. This way a try over the "cold" paths is always non-blocking. It will always try the "cold" paths first (from the first subset) and usually find a "cold" output port to connect to. However, if all the "cold" paths are unavailable, it will try the "hot" paths second (from the second subset) and always find a "hot" path available. At the very next switch stage the "cold" traffic can be routed back onto the "cold" paths, because it will try those paths first at the next switch stage. Thus, rather than rejecting "cold" traffic at the switch if all the "cold" paths are unavailable, it will try a "hot" path in hopes that they are experiencing a lower traffic level at this time and can be used to support a connection to the destination required. Conversely, a connection directed to the second subset of output ports as a "hot" connection will only try the "hot" paths. If all the "hot" paths are unavailable, it will camp-on to the "hot" paths and wait for one of them to become available. This is preferential to trying the first subset of paths which would place "hot" traffic onto "cold" paths and could adversely affect the network's performance.

Figure 4A:
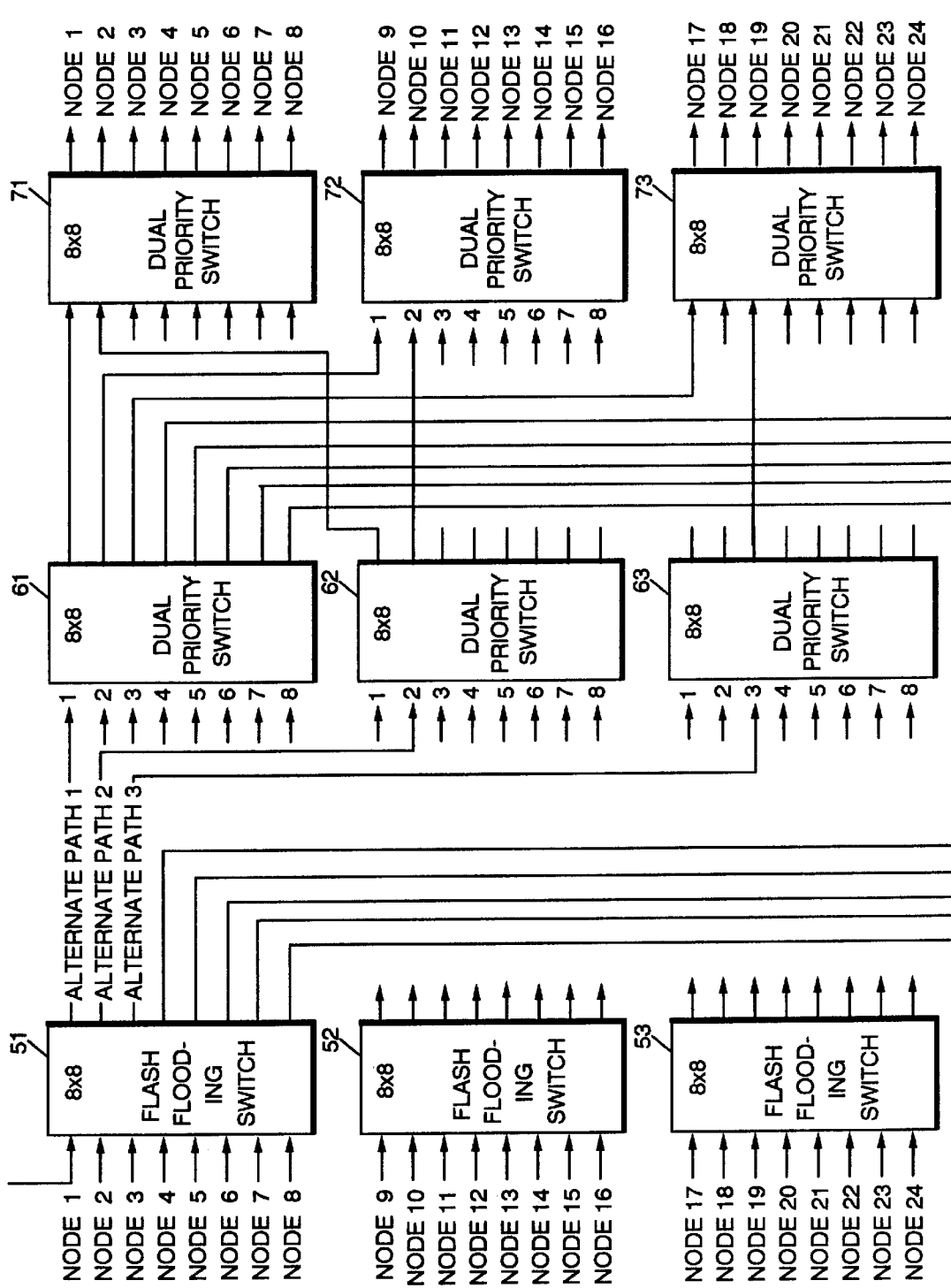
FIG. 4 is a diagram of a three stage 64×64 flash flood network using the selectable function switch of FIG. 1 at each stage, wherein the network comprises a sub-network within the network of FIG. 3.
Figure 4B:
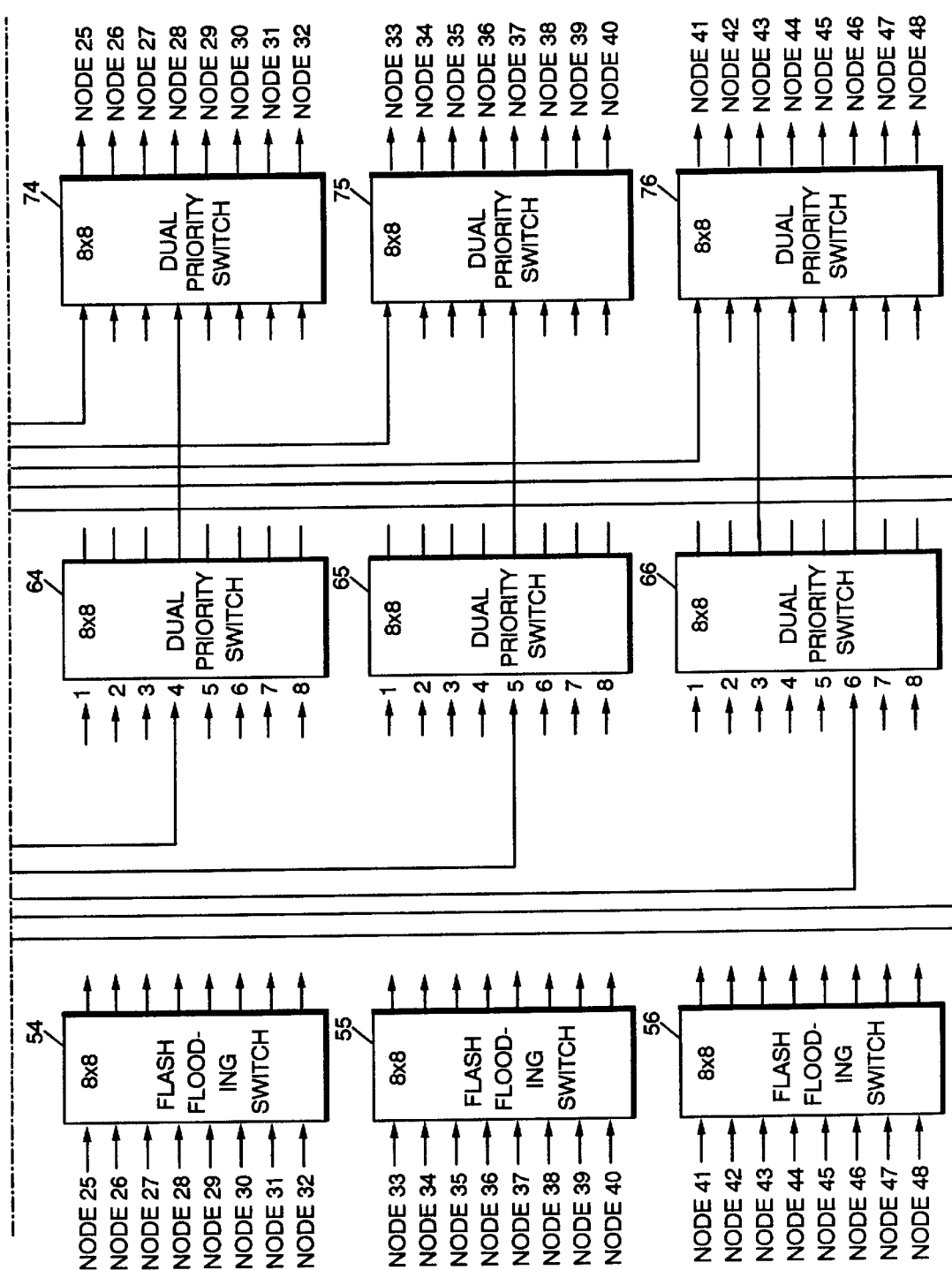
Figure 4C:
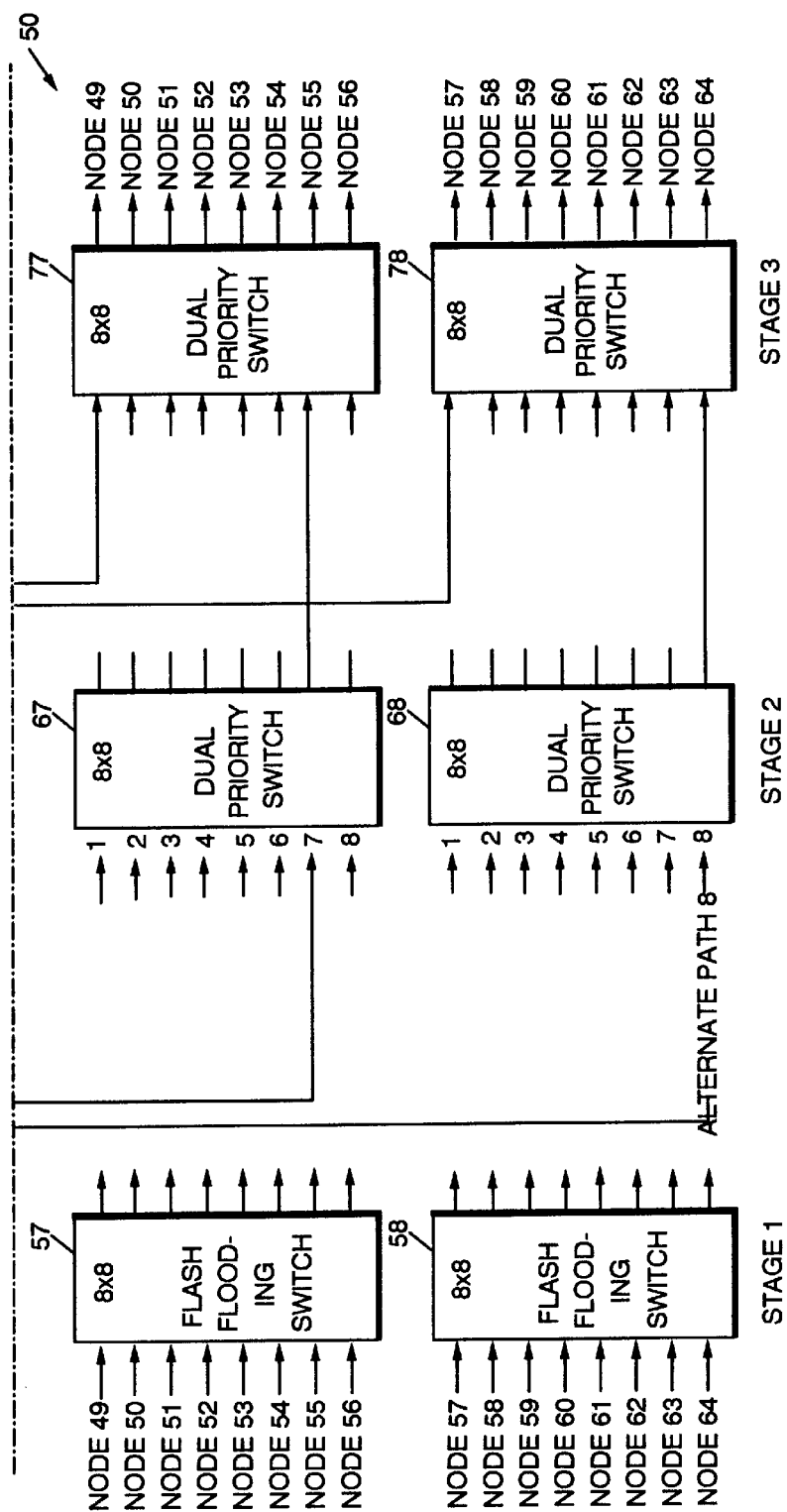

The middle stages of the network 48 are shown as eight sub-networks, each comprising a sixty-four by sixty-four flash flood network 50 like that shown in FIG. 4 and described in detail in U.S. Ser. No. 08/481,854, filed Jun. 1, 1995, entitled "Flash-Flooding Multi-Stage Interconnection Network with Parallel Path Seeking Switching Elements" by Howard T. Olnowich, et al. (IBM Docket #EN9-94-022), pending. The sub-networks comprising the three middle stages of the network 48 are represented by blocks 201 to 208 (wherein all blocks of the three middle stages are shown in the drawing).

It should be noted at this point that each output port from the switches in the first stage of the network 48 defines an alternate route to any destination at the last stage. For instance, the first output port of the switch identified by block 101 defines a path through the first sub-network 50 identified by block 201 to get to any destination; the second output port of the switch identified by block 101 defines a path through the second sub-network identified by block 202 to get to any destination; and so on. Thus, every sub-network identified by blocks 201 to 208 comprising the middle stages of the network 48 provides at least one path from every origination node at the first stage to every destination node at the last stage.

Turning now to FIG. 4, the three stages included in the network 50 (i.e., stages two, three and four of the network 48 of FIG. 3) utilize different functionalities 16 in accordance with the following description. The first stage (i.e., stage two of FIG. 3) comprises eight switches 10 per network 50 configured for the flash-flooding functionality 24. The switches 10 in this stage are represented by blocks 51 to 58. The second and third stages (i.e., stages three and four of FIG. 3) comprise eight switches 10 per network 50 configured for the dual priority functionality 18. The switches 10 in these stages are represented by blocks 61 to 68 and 71 to 78, respectively.

Referring again to FIG. 3, the fifth stage of the network 48 comprises sixty-four switches 10 configured for the dual priority functionality 18. The switches 10 in the fifth stage switches are represented by blocks 301 to 364 (wherein only blocks 301 to 308 are shown to simplify the drawing). Each switch 10 in the fifth stage interfaces with eight output ports, such that the sixty-four switches 10 in the fifth stage interface to a total of five-hundred twelve output ports (or NODES).

The switches 10 in the first stage of the network 48 implementing the path seeking functionality 22 operate in a non-blocking, prioritized path seeking mode that gives the first stage of the network a one-hundred percent probability of making a connection to the second stage. Likewise, the switches 10 in the last stage of the network implementing the dual priority functionality 18 are also non-blocking. Thus, any connection path making its way through the network 48 to the final stage will always be able to connect to the desired destination, provided the destination is available. If the destination is not available, the camp-on switching mode is preferably used to make the final connection.

This leaves the middle stages of the network as the critical stages where blocking could occur. The use of the sixty-four by sixty-four flash flood network 50, however, for the middle stages of the network effectively addresses this blocking concern. One reason for this is that the stages of the network 50 of FIG. 4 are interconnected in a unique way to facilitate the handling of high loading conditions during directed flash-floods. In accordance with this unique interconnection, the first output port of the switch 10 in stage one identified by block 51 is connected to the first input port of the switch 10 in stage two identified by block 61, the second output port of the switch 10 in stage one identified by block 51 is connected to the second input port of the switch 10 in stage two identified by block 52, and so on. Similar connections are made between the remaining switches in stage one (blocks 52–58) and the switches in stage two (blocks 61–68) such that each output port of each switch in the first stage is connected to each input port of a switch in the second stage. This manner of interconnection is important because the priority among and between input ports in the switches of the various stages of the network 50 is assigned in descending order starting with the first input port being of the highest priority. Accordingly, by interconnecting the switches of the first and second stages in this manner, each switch in the first stage connects with every possible priority level to a switch in the second stage. The practical effect of this interconnection is that if all of the switches in the first stage flash-flood simultaneously, each such switch would, due to the priorities and interconnections, win a different switch in the second stage, and all eight simultaneous flash-flood operations would establish a successful connection to the second stage. Other connection methods, such as the conventional method used between the second stage and third stage of the network 50, would in a similar situation result in as few as one successful connection.

Figure 5A:
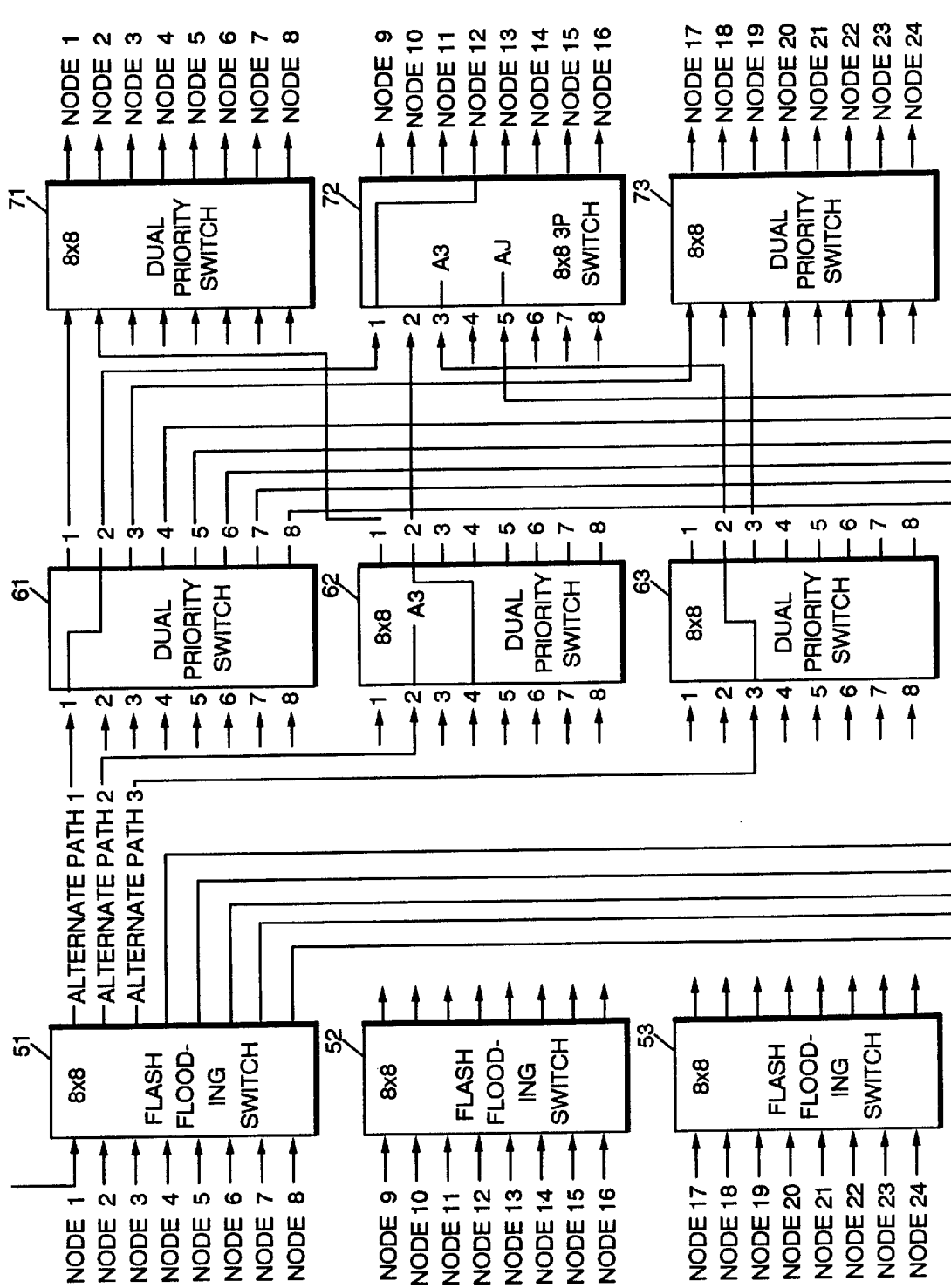
FIG. 5 illustrates an example of a directed flash flood operation in the network of FIG. 4.
Figure 5B:
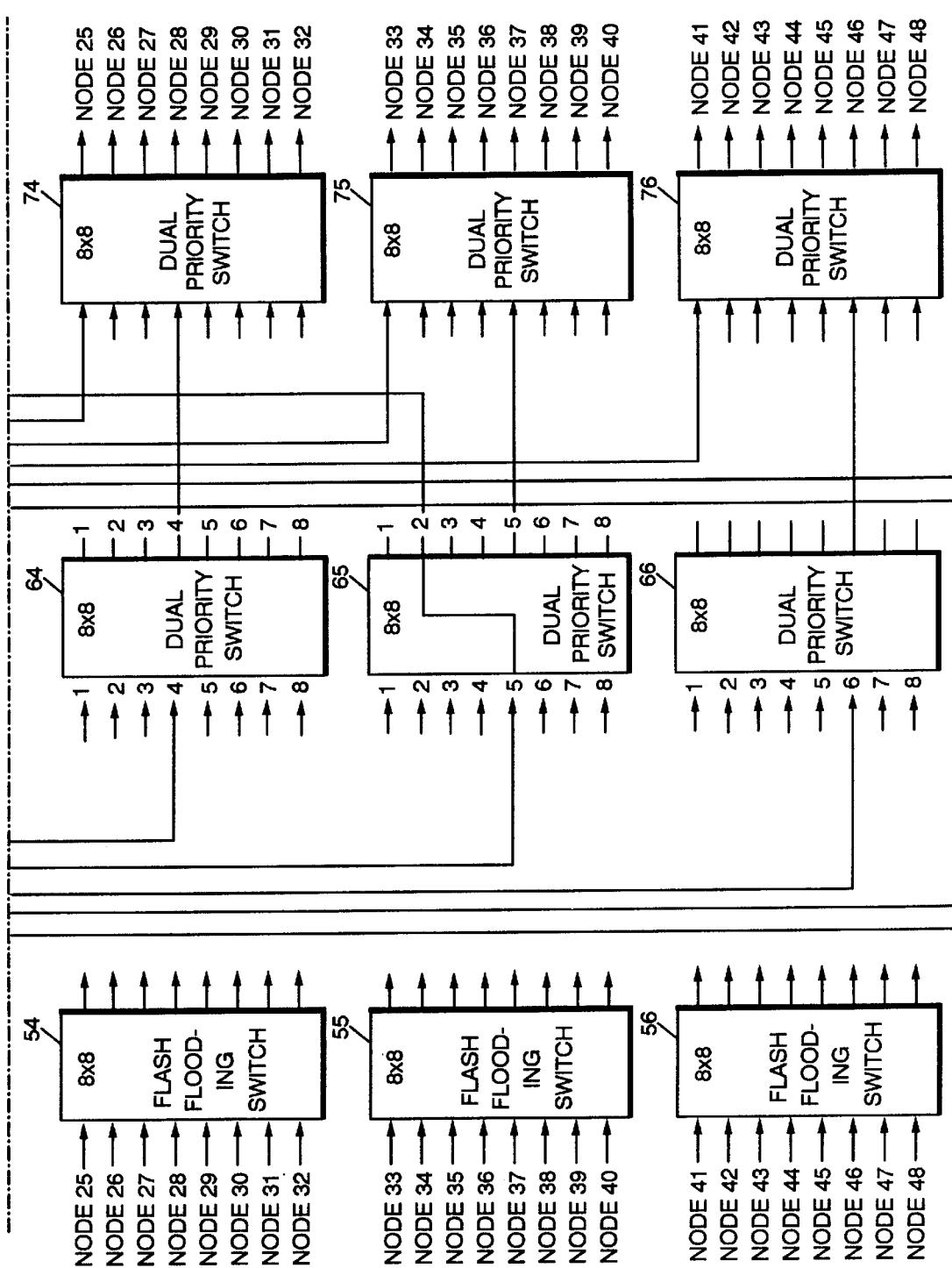
Figure 5C:
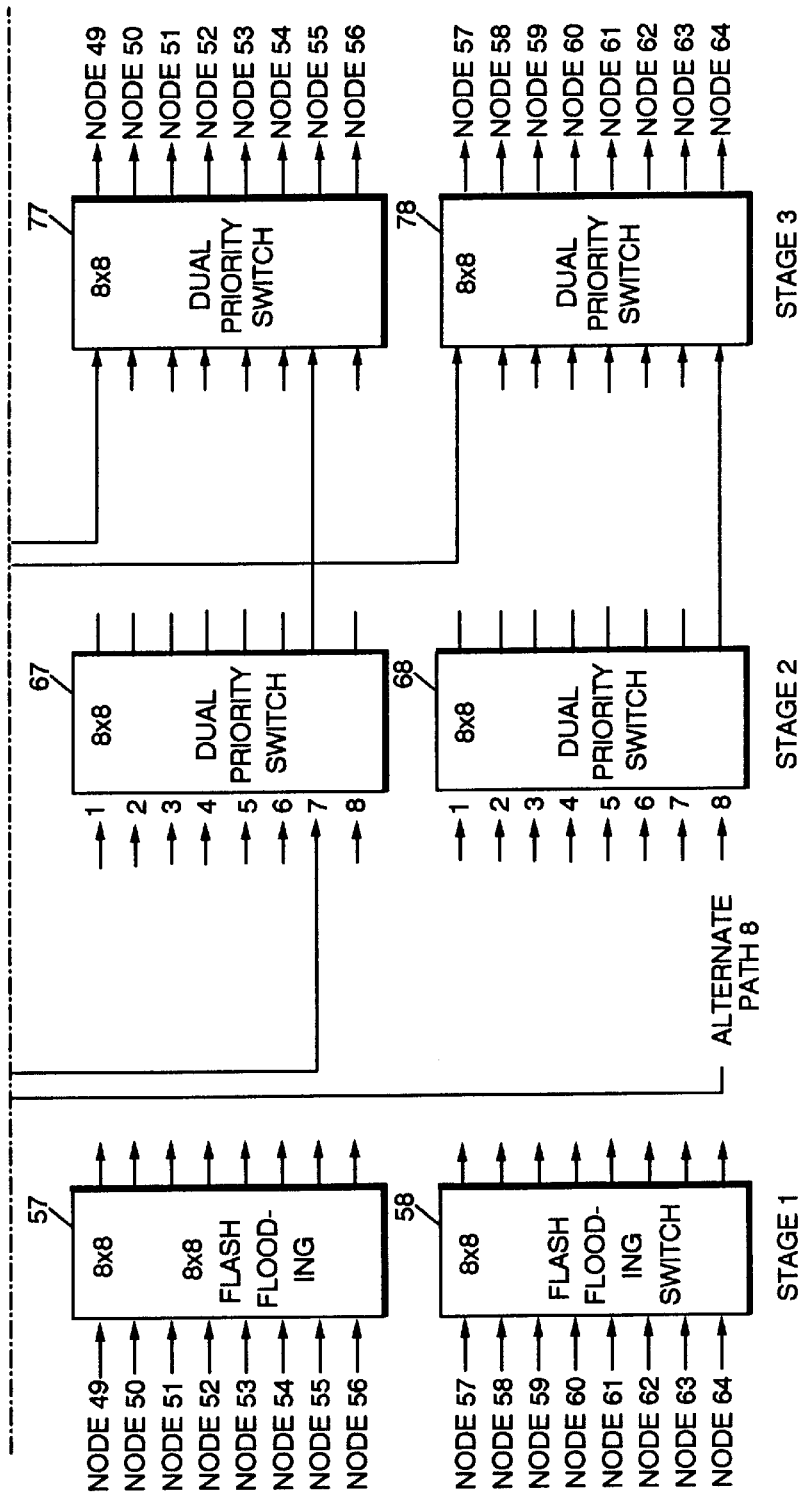

The operation of the network 50 may be better understood through the analysis of a specific example illustrated in FIG. 5. Assume that NODE1 in FIG. 4 wants to send a message to NODE12. There are eight alternate paths from block 51 to NODE 12. The first alternate path runs from output port one of block 51 to block 61 and then to block 72 which in turn connects to NODE 12. The second alternate path runs from output port two of block 51 to block 62 and then to block 72 which in turn connects to NODE 12. The remaining six alternate paths have a similar path trace and are illustrated in FIG. 5.

Now assume that NODE1 commands block 51 to perform a flash flood on alternate paths one through six. The switch 51 then decides in accordance with its flash-flood functionality 24 which of the commanded paths are available and immediately establishes a connection on all of the available paths. This operation by a switch 10 to establish plural parallel connections over commanded paths is called a directed flash-flood.

In this example, we now further assume that block 51 finds that alternate paths four and six are unavailable due to either supporting a previous connection or being failed. Accordingly, the directed flash-flood by block 51 occurs over alternate paths one, two, three and five because these are the only available members of the commanded paths. The functionality 16 of block 51 simultaneously connects to all four output ports for the available alternate paths as shown, and transmits the same information to all four paths.

The communications over the available alternate paths subject to the flash-flood arrive substantially simultaneously at blocks 61, 62, 63 and 65 of the second stage of the network 50. Each of these four switches then attempts to form a connection through their second output port because this is the only second stage output port that leads to block 72 in the third stage and NODE 12 (the final destination). If the second output port of any of the blocks 61, 62, 63 and 65 is previously busy, the attempted connection is rejected at that busy switch only. For example, in this example, block 62 is assumed to have a previous connection from its fourth input port to its second output port as shown blocking the connection of alternate path two. Accordingly, the connection for alternate path two is unsuccessful and rejected as indicated by the symbol "RJ". The connections through the second stage for the alternate paths one, three and five are, however, successfully made and extended through to block 72 in the third stage.

The successful alternate paths one, three and five converge on block 72, because that is the only switch connectable to the desired destination at NODE 12. At block 72 only one of the three successful, flash-flooded alternate paths is connected to the fourth output port and NODE 12. All other paths are rejected. In the current example, alternate path one is connected through block 72 to NODE 12 and alternate paths three and five are rejected as indicated by the symbol "RJ". The determination of a winner between the alternate paths one, three and five is made by block 72 based on either the path to arrive first or the path arriving with the highest priority (based on input port). Thus, in the example, the flash-flood successfully connects NODE 1 to NODE 12 with the shortest possible latency using alternate path one. All partially connected legs of the rejected alternate paths have their connections immediately dropped (broken) as soon as a rejection condition is encountered. This immediately frees these paths to be used in other flash-flood attempts or network connections.

Figure 6A:
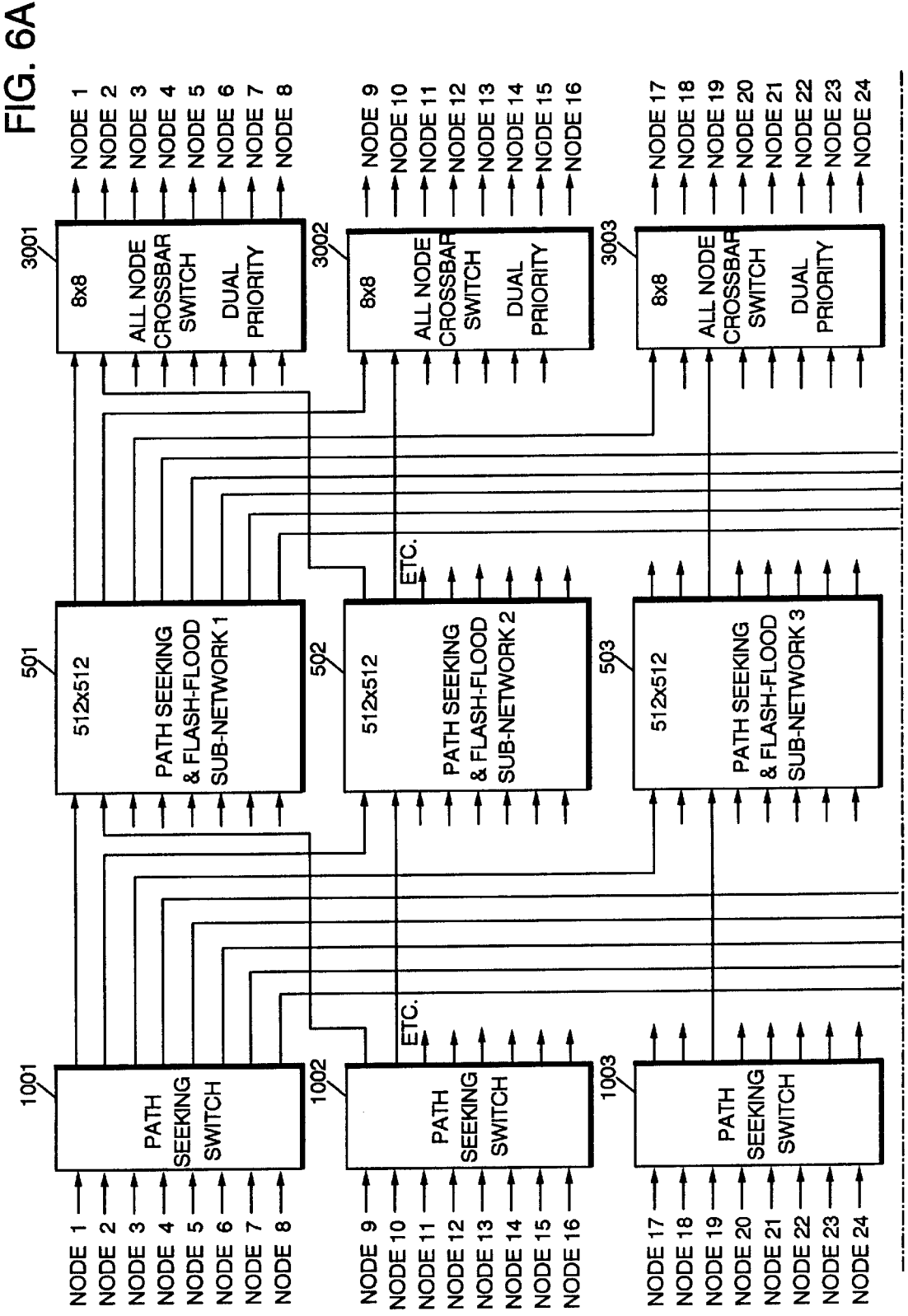
FIG. 6 is a diagram of a seven stage 4096×4096 nested path seeking and flash flood network using the selectable function switch of FIG. 1.
Figure 6B:
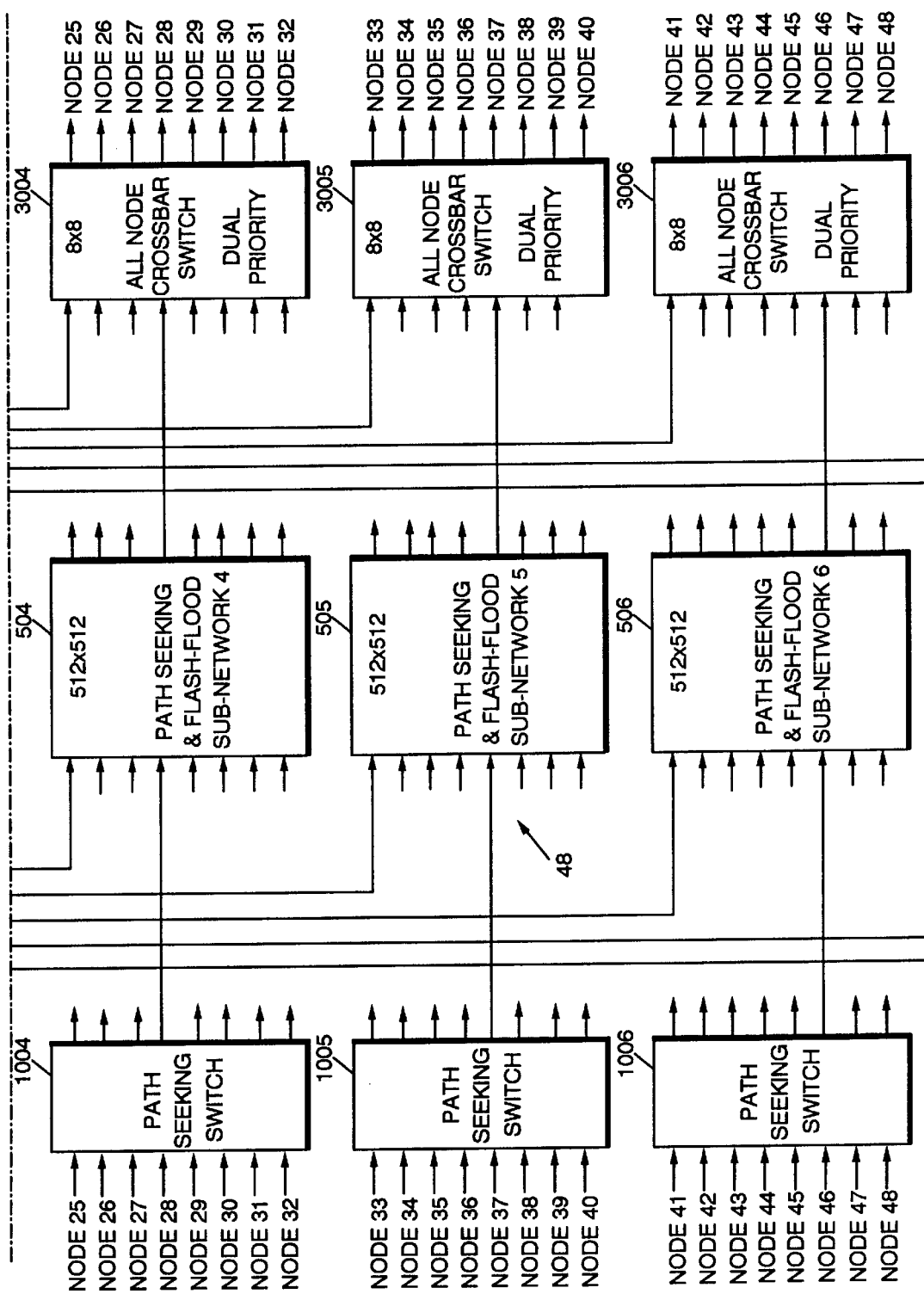
Figure 6C:
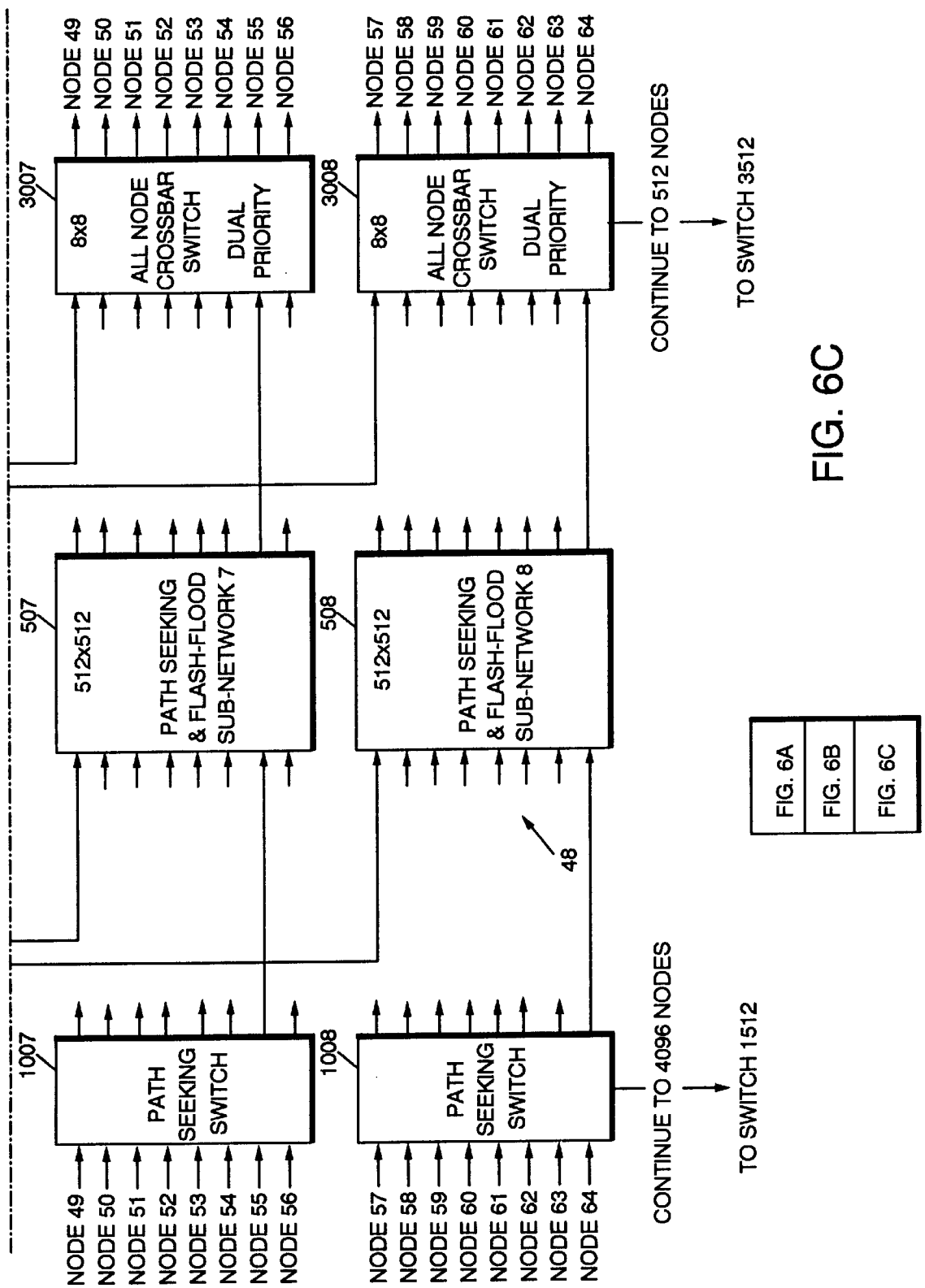

Reference is now made to FIG. 6 wherein it is illustrated that the network 48 of FIG. 3 is expandable to a larger networks consistent with the disclosed nested path seeking and flash-flooding network concept. The network of FIG. 6 interconnects up to four thousand and ninety-six nodes. The layout of the network of FIG. 6 is identical to that of the FIG. 3 network 48 having a first stage of non-blocking and path seeking switches (blocks 1001 to 1512), a final stage of non-blocking dual priority switches (blocks 3001 to 3512), and a middle stage of eight sub-networks (blocks 501 to 508). The sub-networks of the middle stage in FIG. 6 comprise 512×512 sub-networks which may each be the network 48 shown in FIG. 3. The resulting network of FIG. 6 accordingly possesses three non-blocking stages (first, final, and first stage of the middle stage) plus three stages having flash-flood capability.

Figure 7B:
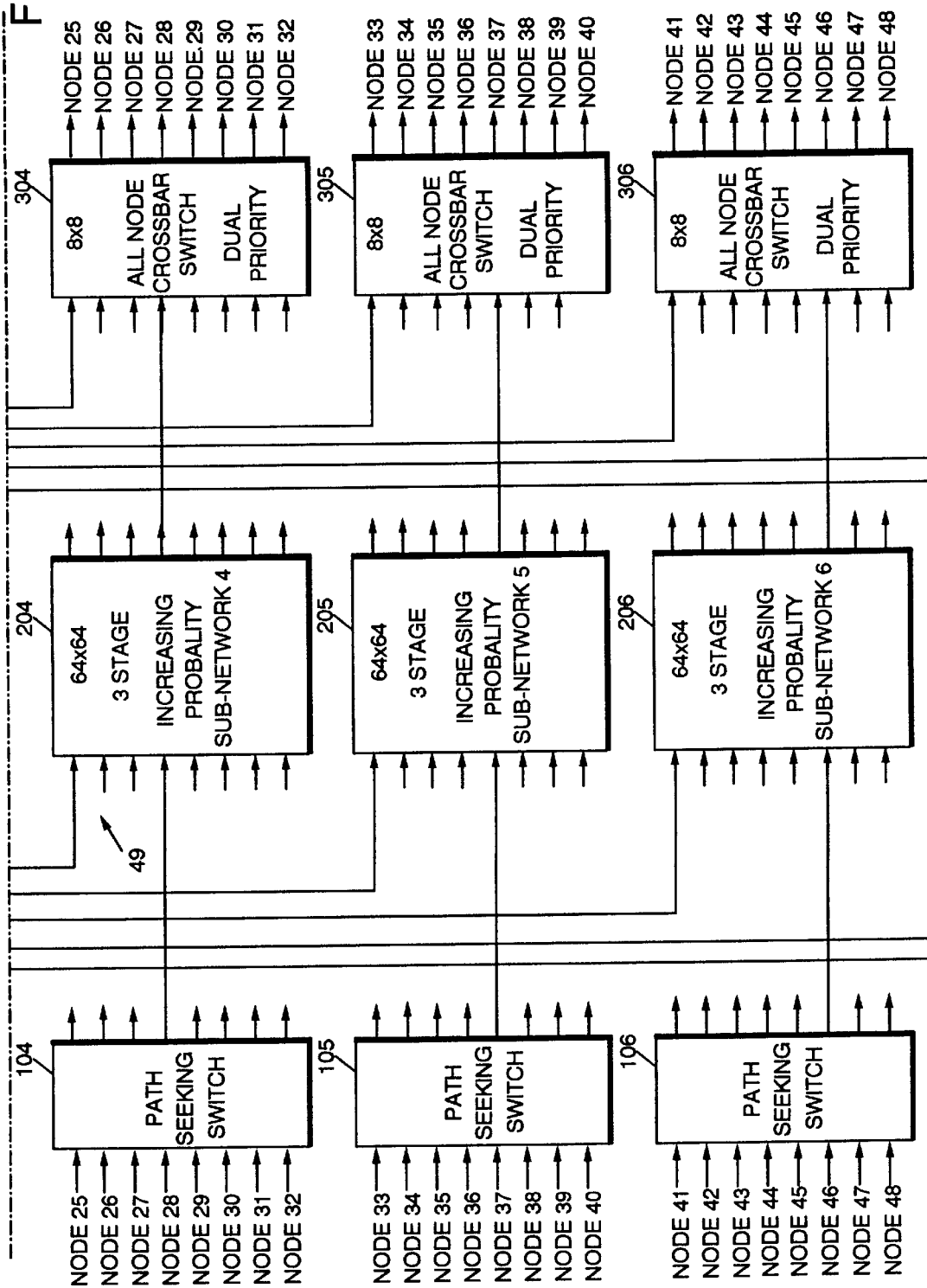
FIG. 7 is a diagram of a five stage 512×512 multi-dilated, path seeking network using the selectable function switch of FIG. 1.
Figure 7C:
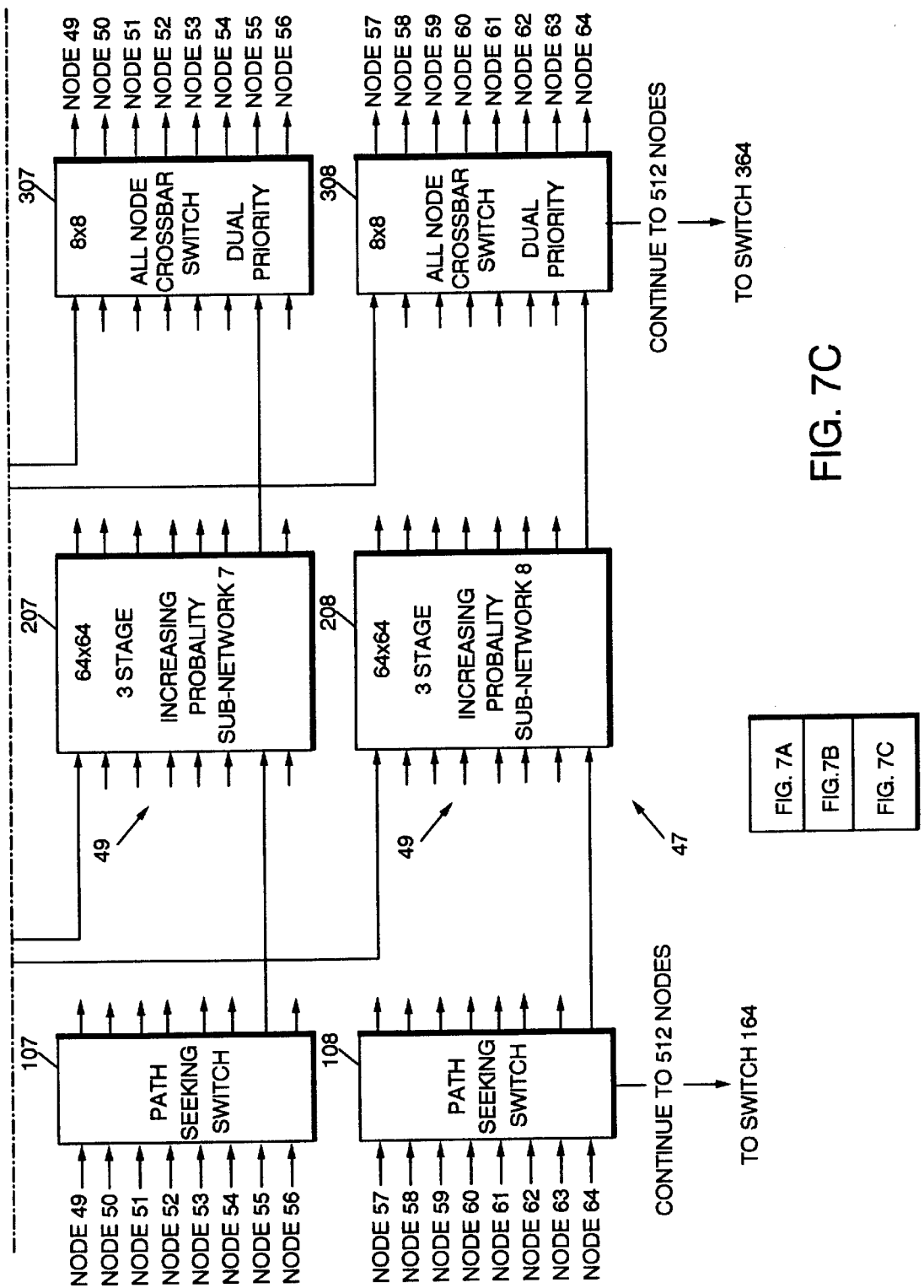

Reference is now made to FIG. 1 and FIG. 7 wherein there is shown an example of a network 47 advantageously utilizing the selectable function switch 10 of the present invention. The network 47 comprises a Multi-Dilated, Path Seeking for servicing five-hundred twelve nodes. The network 47 is formed using three of the four different functionalities 16 provided by the selectable function switch 10. The functionalities used comprise the path seeking functionality 22, the adaptive functionality, and the dual priority functionality 18. By "multi-dilated" it is meant that the utilized functionalities 16 permit different dilations, wherein dilation refers to the adaptiveness of the switch to select among alternate paths. A dilation of eight, for example, means that the switch can choose from any of eight alternate paths to the same destination. In the network 47, dilations supported by the functionality comprise: path seeking functionality 22 with a dilation of eight; four-way adaptive functionality 20 with a dilation of four; two-way adaptive functionality 20 with a dilation of two; and dual priority functionality 18 with a dilation of zero.

The network 47 includes five stages utilizing three different functionalities 16 in accordance with the following description: The first network stage comprises sixty-four switches 10 configured for the path seeking functionality 22. The switches 10 in the first stage switches are represented by blocks 101 to 164 (wherein only blocks 101 to 108 are shown to simplify the drawing). Each switch 10 in the first stage interfaces with eight input ports, such that the sixty-four switches 10 in the first stage interface to a total of five-hundred twelve input ports (or NODES).

Figure 8A:
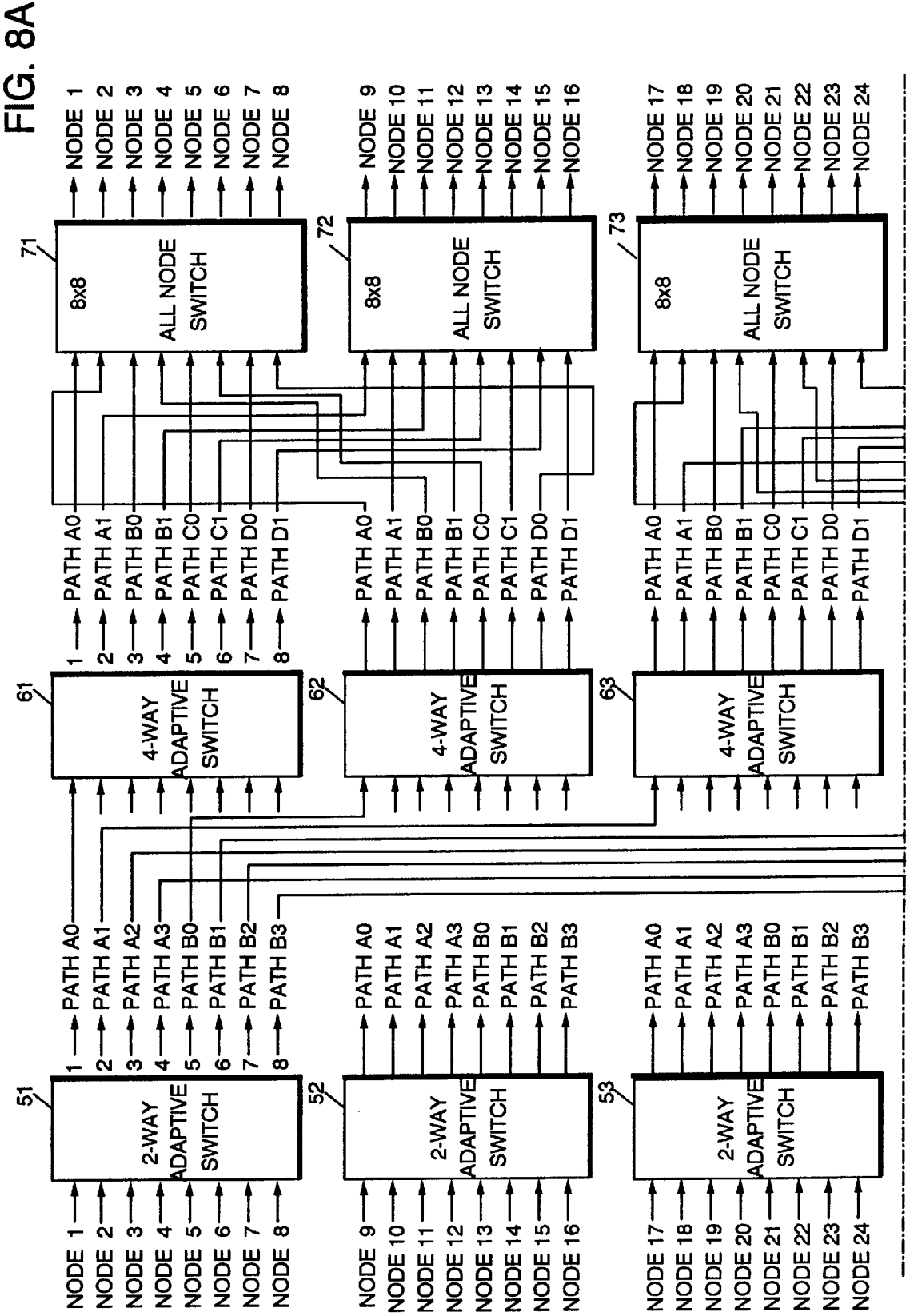
FIG. 8 is a diagram of a three stage 64×64 increasing probability network using the selectable function switch of FIG. 1 at each stage, wherein the network comprises a sub-network within the network of FIG. 7.
Figure 8C:
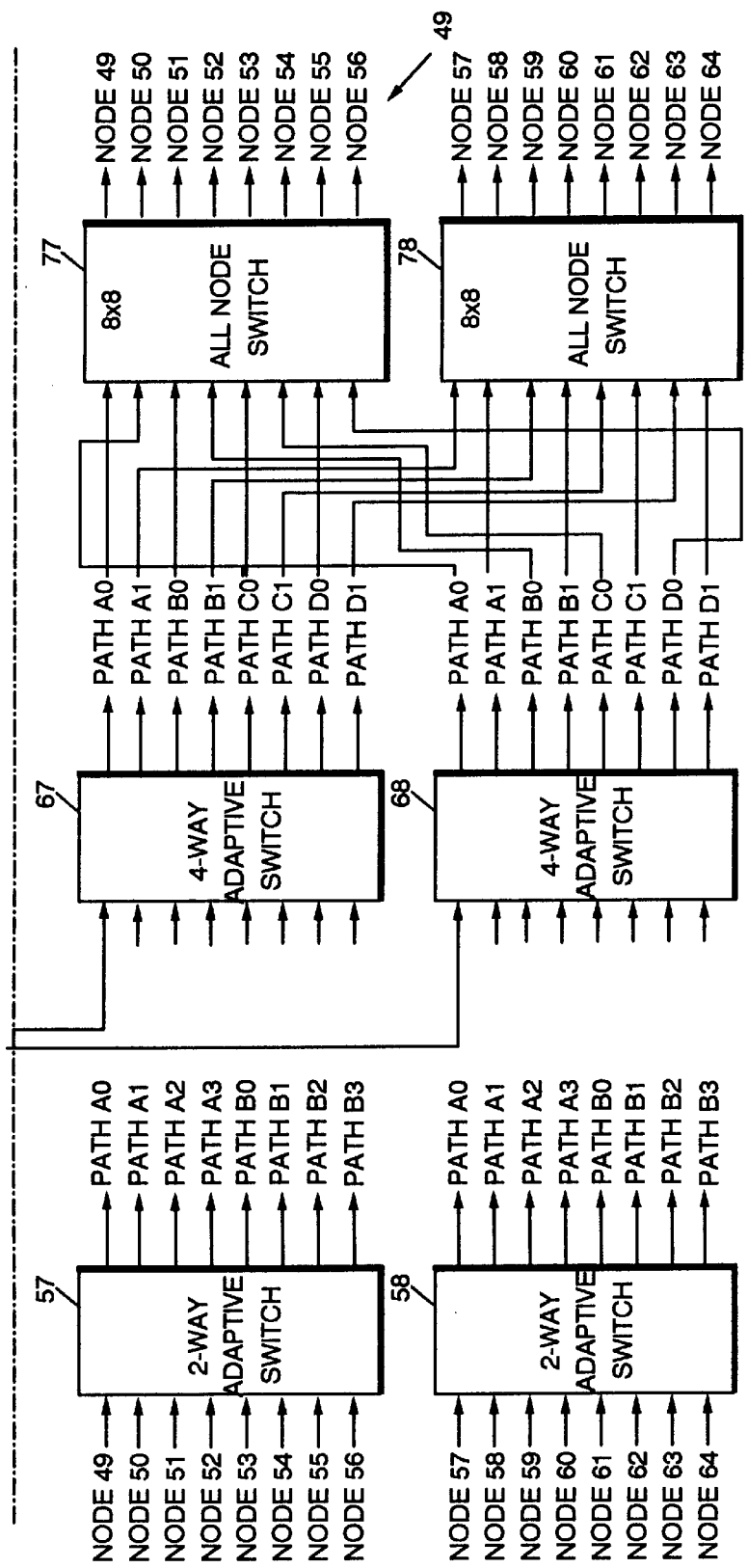
Figure 8C:
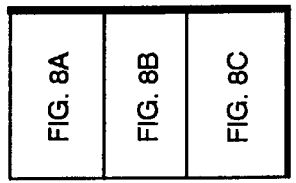

The middle stages of the network 47 are shown as eight sub-networks, each sub-network 49 comprising a sixty-four by sixty-four network that has an increasing probability for success like that shown in FIG. 8 and described in detail in U.S. Ser. No. 07/946,514, filed Sep. 17, 1995, entitled "Increasing Probability Multi-Stage Network" by J. Feeney et al. (IBM Docket #EN9-92-127), now U.S. Pat. No. 5,542,048. The sub-networks 49 comprising the three middle stages of the network 47 are represented by blocks 201' to 208' (wherein all blocks of the three middle stages are shown in the drawing).

The fifth stage of the network 47 comprises sixty-four switches 10 configured for the dual priority functionality 18. The switches 10 in the fifth stage switches are represented by blocks 301 to 364 (wherein only blocks 301 to 308 are shown to simplify the drawing). Each switch 10 in the fifth stage interfaces with eight output ports, such that the sixty-four switches 10 in the fifth stage interface to a total of five-hundred twelve output ports (or NODES).

It should be noted at this point that each output port from the switches in the first stage of the network 47 defines an alternate route to any destination at the last stage. For instance, the first output port of the switch identified by block 101 defines a path through the first sub-network 49 identified by block 201' to get to any destination; the second output port of the switch identified by block 101 defines a path through the second sub-network identified by block 202' to get to any destination; and so on. Thus, every sub-network identified by blocks 201' to 208' comprising the middle stages of the network 47 provides at least one path from every origination node at the first stage to every destination node at the last stage.

The first network stage defined by blocks 101 to 164 uses the path seeking functionality with a dilation of eight to select any of up to eight alternate paths through the network to any destination. The switches thus operate in a non-blocking manner giving the first stage of the network a one-hundred percent probability of making a connection to the second stage. Likewise, the switches in the last stage of the network implementing the dual priority functionality 18 are also non-blocking. Thus, any connection path making its way through the network 47 to the final stage will always be able to connect to the desired destination, provided the destination is available. If the destination is not available, the camp-on switching mode is preferably used to make the final connection.

This leaves the middle stages of the network as the critical stages where blocking could occur. The use of the sixty-four by sixty-four network 49 that has an increasing probability for success, however, for the middle stages of the network 47 effectively addresses this blocking concern.

Turning now to FIG. 8, the three stages included in the network 49 (i.e., stages two, three and four of the network 47 of FIG. 7) utilize different functionalities 16 in accordance with the following description. The first stage (i.e., stage two of FIG. 7) comprises eight switches 10 per network 49 configured for two-way adaptive functionality 20. The switches 10 in this stage are represented by blocks 51' to 58'. The second stage (i.e., stage three of FIG. 7) comprises eight switches 10 per network 49 configured for four-way adaptive functionality 20. The switches 10 in this stage are represented by blocks 61' to 68'. The third stage (i.e., stage four of FIG. 7) comprises eight switches 10 per network 49 configured for the dual priority functionality 18. The switches 10 in these stages are represented by blocks 71' to 78'.

Switches with two-way adaptive functionality (like blocks 51' to 58') choose between two alternate paths, and thus make a connection to only one of two output ports. To illustrate this in the network 49 shown in FIG. 8, assume NODE 1 wants to send a message to NODE 12. There are two distinct paths from block 51' that can provide a path to NODE 12. The first path runs from the first output port of block 51' (Path A0) through block 61', from which several paths are available through to block 72' and NODE 12. The second path runs from the fifth output port of block 51' (Path B0) through block 62', from which several paths are available through to block 72' and NODE 12. It is up to block 51' to determine adaptively which path A0 or B0 to take based on availability. From the foregoing it may be seen that with two-way adaptive functionality each block 51' to 58' in the first stage provides four different paths directed to different quadrants of the network 49 in the second stage.

Switches with four-way adaptive functionality (like blocks 61' to 68') choose between four alternate paths, and thus make a connection to only one of four output ports. To illustrate this in the network 49 shown in FIG. 8, again assume NODE 1 wants to send a message to NODE 12. After reaching block 61', for example, there are four distinct paths from block 61' that can provide a path to NODE 12. The first path runs from the second output port of block 61' (Path A1) through block 72' to NODE 12. The second path runs from the fourth output port of block 61' (Path B1) through block 72' to NODE 12. The third path runs from the sixth output port of block 61' (Path C1) through block 72' to NODE 12. The fourth path runs from the eighth output port of block 61' (Path D1) through block 72' to NODE 12. It is up to block 61' to determine adaptively which path A1, B1, C1 or D1 to take based on availability. From the foregoing it may be seen that with four-way adaptive functionality each block 61' to 68' in the second stage provides two different paths directed to two different blocks of the network 49 in the third stage.

The route taken through a network is defined by a binary coding of the destination node. A typical coding of six-bits is used to define sixty-four destination nodes in the network 49. Different portions of this six-bit code is applied to different stages of the network to find the desired destination NODE. The first two bits of the code ($a0$ and $a1$) are used at the first stage of the network 49 to select one of four paths (Path x0, x1, x2, or x3; wherein x=A or B) each going to a different quadrant of the network. Bit $a2$ of the six-bit destination defines to the second stage of the network 49 which one of two paths (Path x0, x1; wherein x=A, B, C or D) to select. Bits $a3$–$a5$ of the six-bit destination defines to the third stage of the network 49 the destination output port (1–8). Thus, continuing with the foregoing example, the six-bit code for NODE 12 is (00 1 011). The first two bits $a0=0$ and $a1=0$ inform block 51' to choose path 0; i.e., to choose adaptively from either Path A0 or B0. The $a2$ bit=1 and informs block 61' to choose path 1; i.e., to choose adaptively from Paths A1, B1, C1 or D1. The last three bits $a3=0$, $a4=1$ and $a5=1$ comprise the binary equivalent to the number three, and thus identify the fourth output port (NODE 12) in block 72'. Thus, the combination of the destination code with the adaptive functionality 20 of the switch 10 enable the determination of an available route to the destination NODE within the network 49.

Figure 9B:
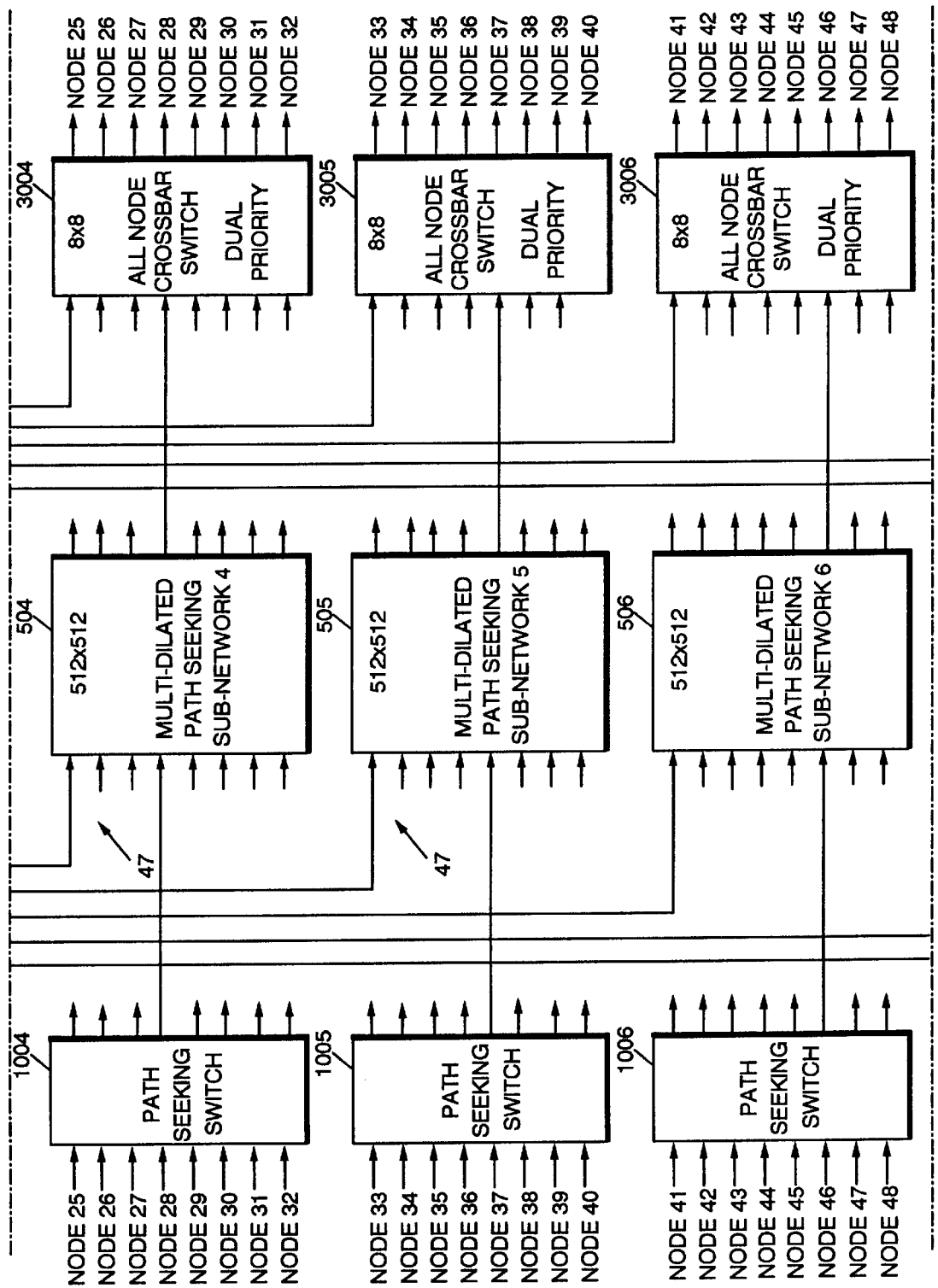
FIG. 9 is a diagram of a seven stage 4096×4096 multi-dilated, path seeking network using the selectable function switch of FIG. 1.
Figure 9C:
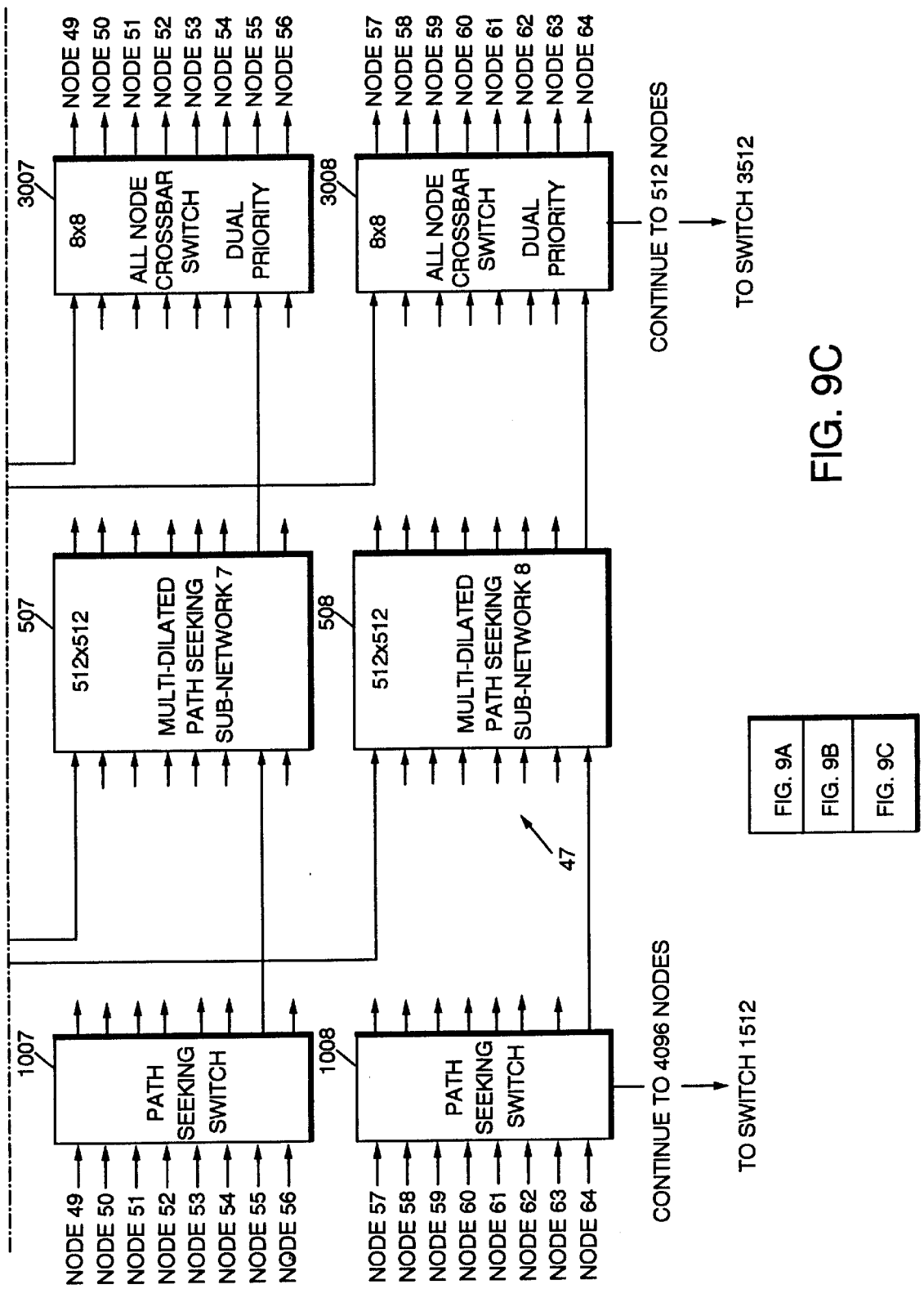

Reference is now made to FIG. 9 wherein it is illustrated that the network 49 of FIG. 7 is expandable to a larger networks consistent with the disclosed Multi-Dilated, Path Seeking network concept. The network of FIG. 9 interconnects up to four thousand and ninety-six nodes. The layout of the network of FIG. 9 is identical to that of the FIG. 7 network 47 having a first stage of non-blocking and path seeking switches (blocks 1001 to 1512), a final stage of non-blocking dual priority switches (blocks 3001 to 3512), and a middle stage of eight sub-networks (blocks 501' to 508'). The sub-networks of the middle stage in FIG. 9 comprise 512×512 sub-networks which may each be the network 47 shown in FIG. 7. The resulting network of FIG. 9 accordingly possesses three non-blocking stages (first, final, and first stage of the middle stage) plus three stages having adaptive capability.

Although preferred embodiments of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A self-routing switch, comprising:
   a plurality of input ports;
   a plurality of output ports;
   a plurality of switching functionalities;
   means for selectively coupling the input ports to the output ports by way of connections in accordance with one of the switching functionalities; and
   means responsive to a received function selection command for controlling operation of the means for selectively coupling to implement the selected switching functionality.

2. The switch as in claim 1 wherein the plurality of functionalities include a dual priority functionality.

3. The switch as in claim 1 wherein the plurality of functionalities include a path seeking functionality.

4. The switch as in claim 1 wherein the plurality of functionalities include an adaptive functionality.

5. The switch as in claim 1 wherein the plurality of functionalities include a flash-flooding functionality.

6. The switch as in claim 1 wherein the means for controlling comprises means for decoding the functionality selection command.

7. The switch as in claim 6 further including means for receiving the functionality selection command over one of the input ports.

8. The switch as in claim 7 wherein each input port includes a plurality of data lines, and the functionality selection command is transmitted over at least one of the data lines.

9. The switch as in claim 6 further including means for receiving the functionality selection command over a serial data interface.

10. The switch as in claim 9 further including means for reading a previously received functionality selection command over the serial data interface.

11. The switch as in claim 6 further including means for receiving the functionality selection command over a hardwired interface.

12. A multi-stage interconnection network, comprising:
   a first stage including a plurality of first self-routing switches, each first switch including a plurality of input ports and a plurality of output ports and capable of operation in one of a plurality of switching functionalities;
   a second stage including a plurality of second self-routing switches, each second switch including a plurality of input ports and a plurality of output ports and capable of operation in one of a plurality of switching functionalities;
   means for connecting the output ports of each first switch in the first stage to second switches of the second stage forming a plurality of paths therebetween; and
   means for selecting a switching functionality for operation by the switches in the first stage and a switching functionality for operation by the switches in the second stage.

13. The network as in claim 12 wherein the plurality of switching functionalities include a dual priority functionality.

14. The network as in claim 12 wherein the plurality of switching functionalities include a path seeking functionality.

15. The network as in claim 12 wherein the plurality of switching functionalities include an adaptive functionality.

16. The network as in claim 12 wherein the plurality of switching functionalities include a flash-flooding functionality.

17. The network as in claim 12 wherein the means for selecting a switching functionality comprises means in each switch of each stage for decoding a functionality selection command.

18. The network as in claim 17 wherein the means for decoding includes means for receiving the functionality selection command from over data lines at each input port of each switch.

19. The network as in claim 17 wherein the means for decoding included means for receiving the functionality selection command over a serial data link at each switch.

20. The network as in claim 17 wherein the means for decoding included means for receiving the functionality selection command via a hardwired connection at each switch.

* * * * *